(12) United States Patent
Lerner et al.

(10) Patent No.: US 6,859,909 B1
(45) Date of Patent: Feb. 22, 2005

(54) SYSTEM AND METHOD FOR ANNOTATING WEB-BASED DOCUMENTS

(75) Inventors: Matthew Rubin Lerner, Berkeley, CA (US); Oliver Hurst-Hiller, San Francisco, CA (US); Jesse Gardner Kocher, San Francisco, CA (US); David Keel Peck, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/521,022

(22) Filed: Mar. 7, 2000

(51) Int. Cl.[7] ............................................. G06F 15/00

(52) U.S. Cl. ...................... 715/512; 715/530; 345/440; 709/203

(58) Field of Search ............................. 715/512, 501.1, 715/530, 526, 500; 345/440; 709/203, 217

(56) References Cited

U.S. PATENT DOCUMENTS

| | | | | |
|---|---|---|---|---|
| 5,822,539 A | * | 10/1998 | van Hoff | 709/236 |
| 5,826,025 A | * | 10/1998 | Gramlich | 709/217 |
| 6,081,829 A | * | 6/2000 | Sidana | 709/203 |
| 6,262,728 B1 | * | 7/2001 | Alexander | 345/440.1 |
| 6,457,026 B1 | * | 9/2002 | Graham et al. | 715/512 |
| 6,687,878 B1 | * | 2/2004 | Eintracht et al. | 715/512 |

OTHER PUBLICATIONS

Wilcox, Lynn D. et al. "Dynomite: A Dynamically Organized Ink and Audio Notebook", CHI 97, Mar. 22–27, 1997. pp 186–193.
Price, Morgan N, et al. "XLibris: The Active Reading Machine". CHI 98, Apr. 18–23, 1998. Pp 22–23.
Schilit, Bill N. et al. "Beyond Paper: Supporting Active Reading with Free Form Digital Ink Annotations". CHI 98, Apr. 18–23, 1998. Pp 249–256.
Schilit, Bill N. et al., "Digital Library Information Appliances" Digital Library 98; Pittsburgh, PA. Pp 217–226.
Moran, Thomas P. et al. "Spatial Interpretation of Domain Objects Integrated into a Freeform Electronic Whiteboard" UIST '98, San Francisco, CA. Pp 175–184.
Kurtenbach, Gordon et al. "Issues in Combining Marking and Direct Manipulation Techniques" UIST '91, Nov. 11–13, 1991. Pp 137–144.
Long Jr., A. Chris, "Dissertation Proposal: The Design and Evaluation of Gestures for Pen–based User Interfaces". Qualifying Exam Proposal References, pp 1–8.

(List continued on next page.)

*Primary Examiner*—Joseph H. Feild
*Assistant Examiner*—Maikhanh Nguyen
(74) *Attorney, Agent, or Firm*—Banner & Witcoff, Ltd.

(57) ABSTRACT

The present invention allows computer users to integrate any annotation, including ink, highlighter, text-based notes and audio, directly into a Web-based document (WBD) displayed by a Web browser. This integration enables others to view the personalized annotated WBD, which retains its original active links and properties, over the Internet without the need for specialized software. Annotations are integrated into WBDs by freezing the WBD, overlaying an image file containing the annotations onto the WBD, and enabling browser events to pass through the image layer. Annotations may also be integrated into WBDs by using component object technology. The present invention collects and organizes annotated WBDs, and provides users with an intuitive Web-based interface for accessing, viewing and searching the annotated WBDs. Users may annotate blank WBDs, effectively converting their Web browsers into online notebooks/ scrapbooks. The present invention also provides users with many novel interface techniques, such as dog-ears and its associated navigation tools, splitting pages, turning pages, selecting and copying various portions of a WBD (including shaking out a copy), and marking menus suited for right-handed or left-handed users.

6 Claims, 23 Drawing Sheets

OTHER PUBLICATIONS

Gross, Mark D.,et al. "Ambiguous Intentions: a Paper-like Interface for Creative Design", UIST '96, Seattle Washington. Pp 183–192.

Moran, Thomas, P. et al., "Pen-Based Interaction Techniques for Organizing Material on an Electronic Whiteboard". UIST '97, Banff, Alberta, Canada. Pp 45–54.

Forsberg, Andrew et al., "The Music Notepad". Brown University, Providence RI, 7 pages.

Lerner, Matt A Survey of Pen–Based User Interfaces: When Will They Be as Good as Pencil and Paper? Brown University, Providence RI, 713 pages.

Davis, Richard C., et al. "A Framework for Sharing Handwritten Notes". UIST '98, San Francisco, CA. Pp 119–120.

Landay, James A. et al. "Sketching Storyboards to Illustrate Interface Behaviors". HCI Institute, Carnegie Mellon University, 2 pages.

Landay, James A. et al. "Interactive Sketching for the Early Stages of User Interface Design", Carnegie Mellon University, 8 pages.

Long Jr., Allan Christian "Improving Gestures and Interaction Techniques for Pen–Based User Interfaces". CHI '98, Apr. 18–23, 1998. Pp 58–59.

Rubine, Dean. "Combining Gestures and Direct Manipulation" CHI '92, May 3–7, 1992. Pp 659–660.

Kurtenbach, Gordon et al. "Contextual Animation of Gestural Commands". Xerox Palo Alto Research Center, Palo Alto, CA, University of Toronto, 14 pages.

Tapia, Mark A., et al., "Some Design Refinements and Principles on the Appearance and Behavior of Marking Menus" UIST '95, Nov. 14–17, 1995. Pp 189–195.

Moran, Thomas P. et al. "Implicit Structures for Pen-Based Systems Within a Freeform Interaction Paradigm", Xerox Palo Alto Research Center, Palo Alto, CA, 11 pages.

Bier, Eric A. et al. "Toolglass and Magic Lenses: The See–Through Interface" Xerox Palo Alto Research Center, Palo Alto, CA, University of Toronto, University of Washington, 8 pages.

* cited by examiner

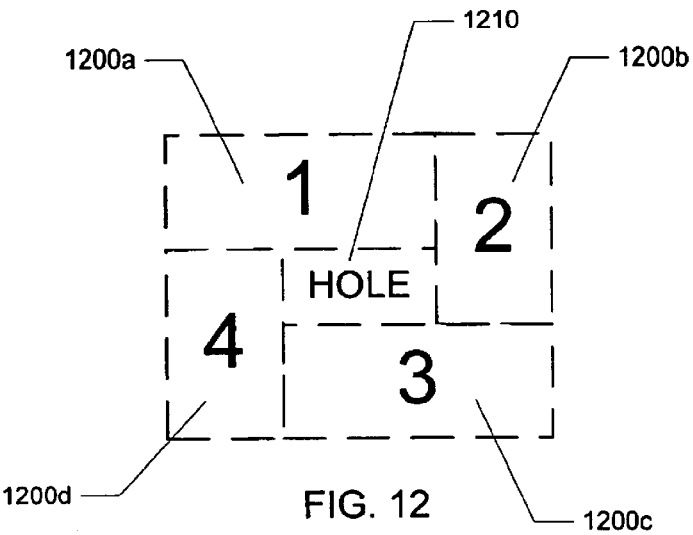
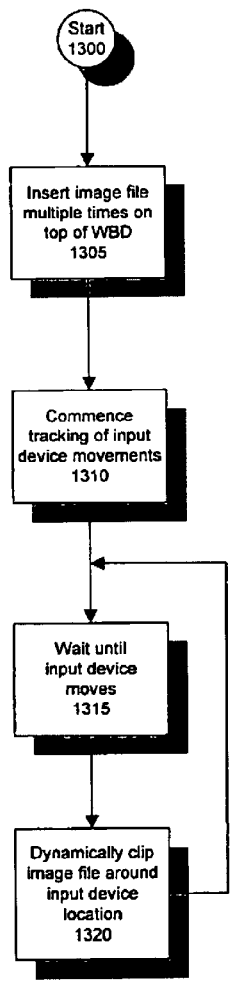
FIG. 13

SYSTEM AND METHOD FOR ANNOTATING WEB-BASED DOCUMENTS

FIELD OF THE INVENTION

The present invention relates to a system and method of marking, organizing, and searching Web-based documents.

BACKGROUND INFORMATION

Standard desktop word processing applications enable computer users to create and edit text-based documents. To provide computer users with more flexibility in the editing and markup of these documents, software utilities exist that integrate electronic sticky notes and users' on screen drawing directly into the document. This type of document annotation enables users to mark and view documents on screen as if the documents were in front of them on paper.

However, the current annotation system requires users to annotate documents compatible with specific word processing applications that lack portability. For example, if a user wanted to send another person an annotated document, the user would have to e-mail the document as an attachment and hope the recipient has the same application software to view the document Accordingly, there is a need in the art for a simple method and system of annotating and collecting Web-based documents. There is a need for the integration of any type of annotation, including text, ink, highlighter, and audio, directly into Web-based documents, such that any person with a Web browser may view the annotations, with or without the software used to create the annotations. There is also a need for a method and system of annotating and collecting blank Web-based documents, effectively converting a Web browser into an online notebook/scrapbook.

SUMMARY OF THE INVENTION

The present invention relates to the integration of any annotation, including ink, highlighter, text-based notes and audio, directly into a Web-based document (WBD) displayed by a Web browser. This integration enables others to view the personalized annotated WBD, which retains its original active links and properties, over the Internet without the need for specialized software. Annotations are integrated into WBDs by freezing the WBD, overlaying an image file containing the annotations onto the WBD, and enabling browser events to pass through the image layer. Annotations may also be integrated into WBDs by using component object technology. The present invention collects and organizes annotated WBDs, and provides users with an intuitive Web-based interface for accessing, viewing and searching the annotated WBDs. Users may annotate blank WBDs, effectively converting their Web browsers into online notebooks/ scrapbooks. The present invention also provides users with many novel interface techniques, such as dog-ears and its associated navigation tools, splitting pages, turning pages, selecting and copying various portions of a WBD (including shaking out a copy), and marking menus suited for right-handed or left-handed users.

BRIEF DESCRIPTION OF THE DRAWINGS

FIG. 12 is a block diagram depicting the structure of WBD layers that enable Web browser events to pass through annotations in accordance with an exemplary embodiment of the present invention.

FIG. 13 is a flowchart of steps for passing Web browser events through annotations in accordance with an exemplary embodiment of the present invention.

DETAILED DESCRIPTION

Introduction

The present invention fulfills this need in the art by allowing computer users to integrate any annotation, including ink, highlighter, text-based notes and audio, directly into a Web-based document (WBD) displayed by a Web browser. Users may create annotations on preexisting WBDs or new blank WBDs, and can collect and organize annotated WBDs through an intuitive Web-based interface using many novel interface techniques.

INFRASTRUCTURE

Figure 1:
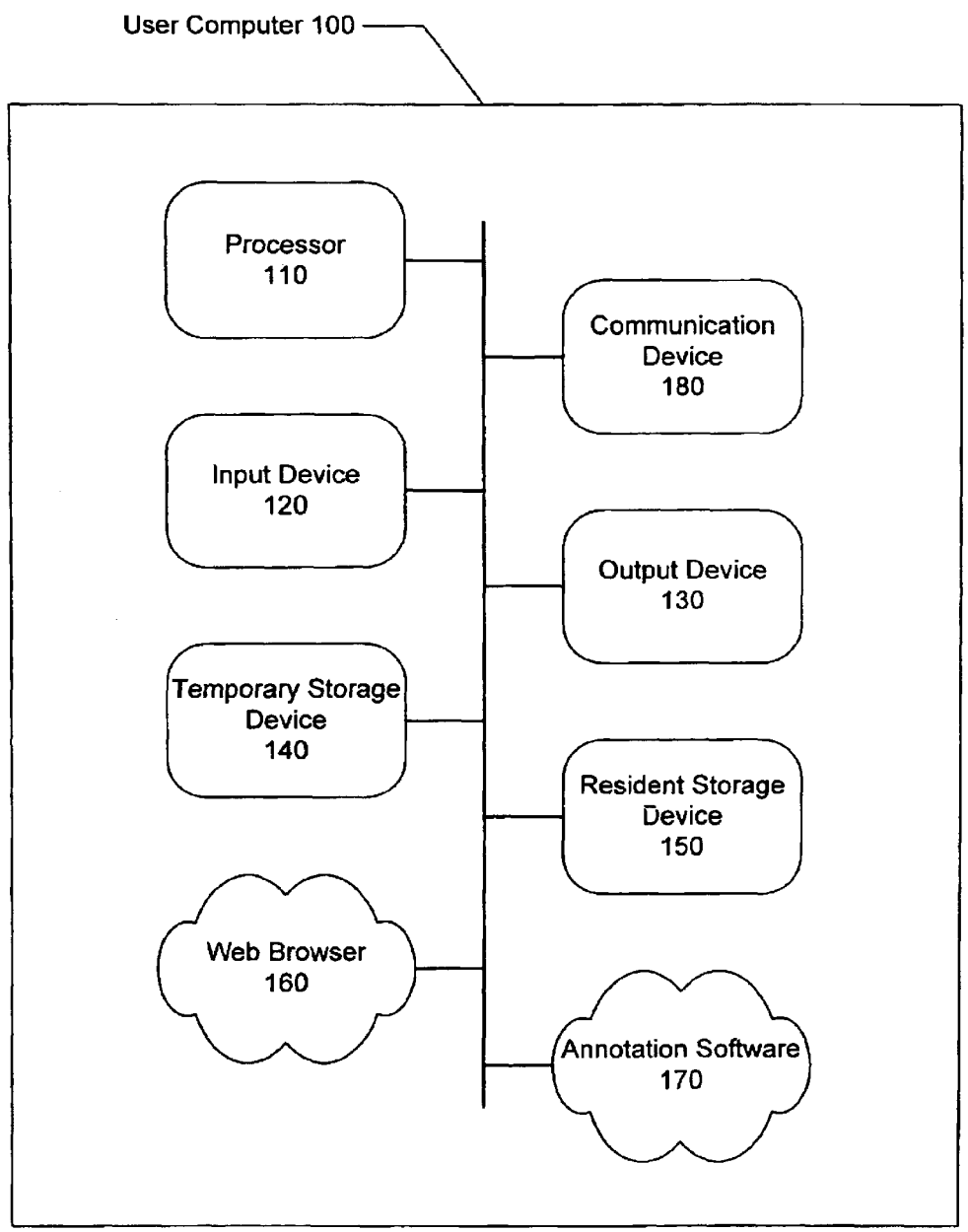
FIG. 1 is a block diagram depicting the internal structure of a user's computer in accordance with an exemplary embodiment of the present invention.

FIG. 1 is a block diagram depicting the internal structure of a user's computer in accordance with an exemplary embodiment of the present invention. User computer 100 may be a personal computer, handheld personal digital assistant ("PDA"), or any other type of microprocessor-based device. User computer 100 may include a processor 110, input device 120, output device 130, temporary storage device 140, resident storage device 150, and communication device 180. Input device 120 may include a keyboard, mouse, pen-operated touch screen, voice recognition device, and any other device that provides input from a user. Output device 130 may include a monitor, printer, disk drive, speakers, or any other device that provides tangible output to user. Temporary storage device 140 may include RAM, caches, and any other volatile storage medium that temporarily holds data while processing it. Resident storage device 150 may include a hard drive, CD-ROM drive, tape drive, removable storage disk, or any other nonvolatile data storage medium. Annotation software 170 and software for a Web browser 160 may reside in resident storage device 150. Annotation software 170 may include, among others, a Web browser plug-in, independent software program or a feature of an operating system. Web browser 160 may include, among others, Microsoft's Internet Explorer or Netscape Navigator. Communication device 180 may include a modem, network interface card, or any other device able to transmit and receive signals over a network. One skilled in the art would appreciate that the components of user computer 100 may also be connected wirelessly, possibly through an infrared connection.

Figure 2:
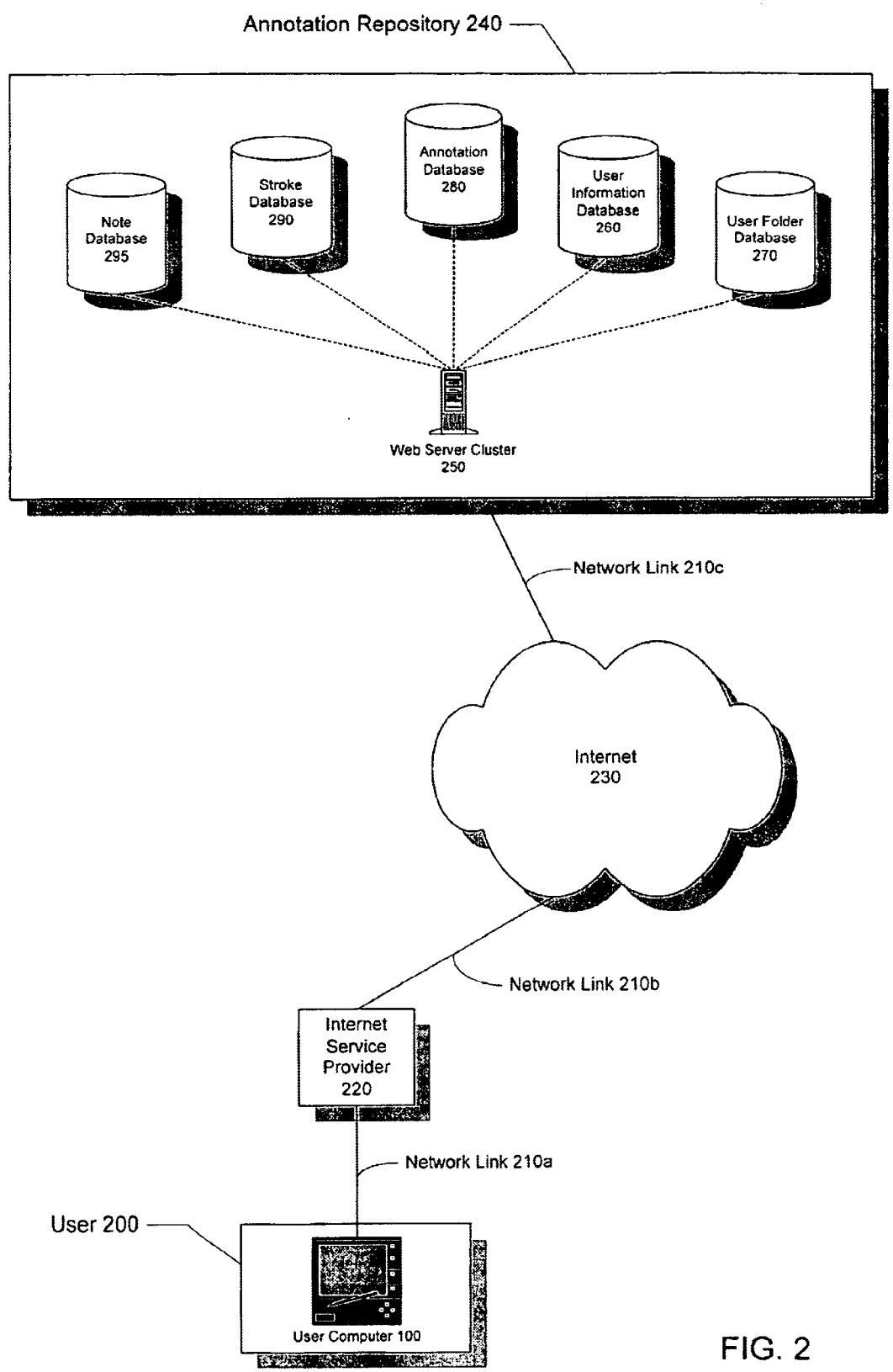
FIG. 2 is a block diagram depicting a network architecture that facilitates the storing, searching and transfer of annotated WBDs in accordance with an exemplary embodiment of the present invention.

FIG. 2 is a block diagram depicting a network architecture that facilitates the storing, searching and transfer of annotated WBDs in accordance with an exemplary embodiment of the present invention. According to one embodiment, after user 200 annotates a WBD through Web browser 160, annotation software 170 transmits it to annotation repository 240 (i.e., server arrangement) via network link 210*a*, Internet service provider 220, network link 210*b*, Internet 230, and network link 210*c*. Network link 210 may include telephone lines, DSL, cable networks, T1 lines, ATM/SONNET, wireless networks, or any other arrangement that allows for the transmission and reception of network signals. It should be noted that, technically, user computer 100, Internet service provider 220 and Web server cluster 250 are also part of the Internet 230 because of their connectivity.

In an exemplary embodiment, annotation repository 240 is a Website that receives the annotated WBD through its Web server cluster 250, which may comprise a collection of Web server computers working in tandem to distribute the load of network traffic. These Web servers include processors and memory for executing program instructions as well network interfaces. Annotation repository 240 also comprises, among other components, user information database 260, user folder database 270, annotation database 280, stroke database 290 and note database 295. Those skilled in the art realize that these single-record databases may be represented in many different ways, such as individual tables in one or more relational databases. Although all annotation-related information is sent to annotation repository 240, this information may also be stored in temporary storage device 140 or resident storage device 150 for efficiency reasons.

Figure 3:
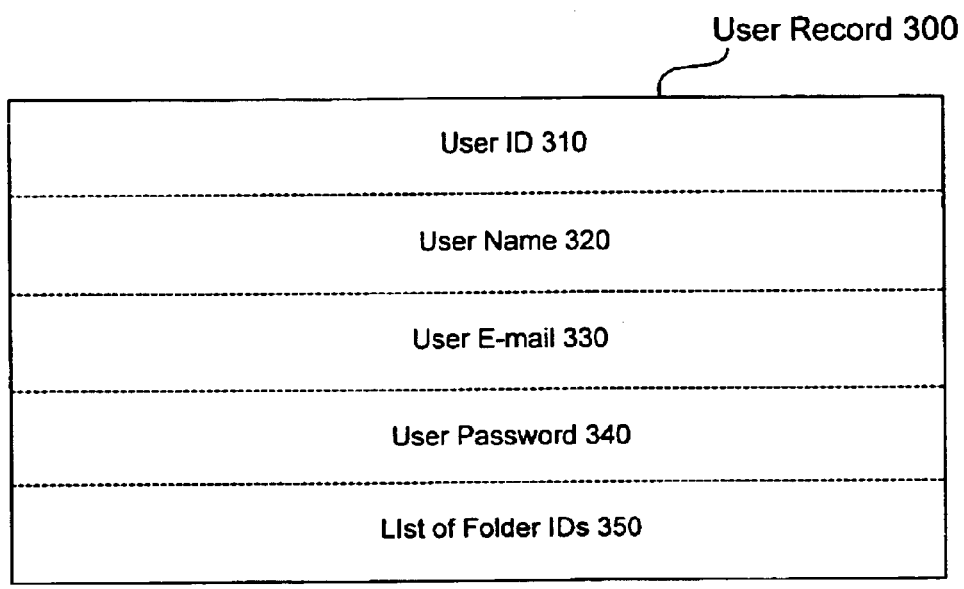
FIG. 3 depicts a data structure of a user record that is used to store information in a user information database in accordance with an exemplary embodiment of the present invention.

FIG. 3 depicts a data structure of a user record that is used to store information in user information database 260 in accordance with an exemplary embodiment of the present invention. Each user record represents a single unique user of annotation repository 240, and a user record is created when a user 200 creates an account online. In particular, user record 300 includes a user ID 310 field, a user name 320 field, a user e-mail 330 field, a user password 340 field, and a list of folder IDs 350 field. User ID 310 contains an integer value that identifies each user record 300 in user information database 260. User name 320 contains a unique ASCII string that represents each user 200 associated with annotation repository 240. User e-mail 330 contains a unique ASCII string that represents the e-mail address of each user 200 associated with annotation repository 240. User password 340 contains a unique ASCII string chosen for security purposes by each user 200 associated with annotation repository 240. The password may be encrypted using any standard UNIX utility, such as salt or crypt. And list of folder IDs 350 contains a linked list of references to records stored in user folder database 270.

Figure 4:
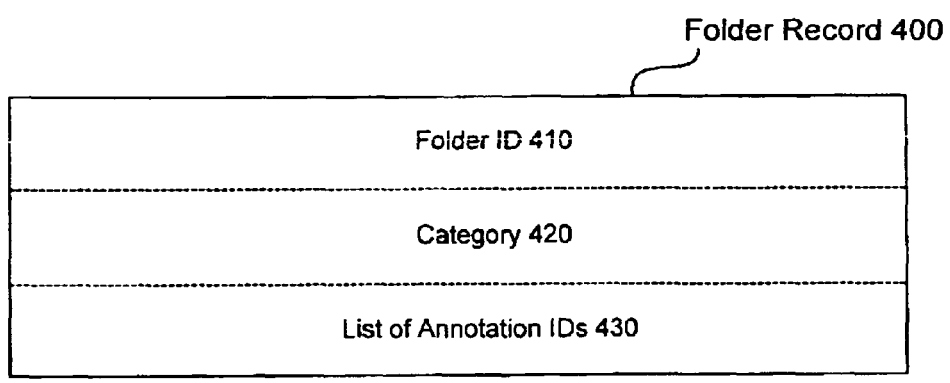
FIG. 4 depicts a data structure of a folder record that is used to store information in a user folder database in accordance with an exemplary embodiment of the present invention.

FIG. 4 depicts a data structure of a folder record that is used to store information in user folder database 270 in accordance with an exemplary embodiment of the present invention. Each folder record contains a list of annotated WBDs that relate to a certain category for each user 200. In particular, folder record 400 includes a folder ID 410 field, a category 320 field, and a list of annotation IDs 430 field. Folder ID 410 contains an integer value that identifies each folder record 400 in user folder database 270. Category 420 contains an ASCII string that describes the category of associated annotated WBDs. And list of annotation IDs 430 contains a linked list of references to records stored in annotation database 280.

Figure 5:
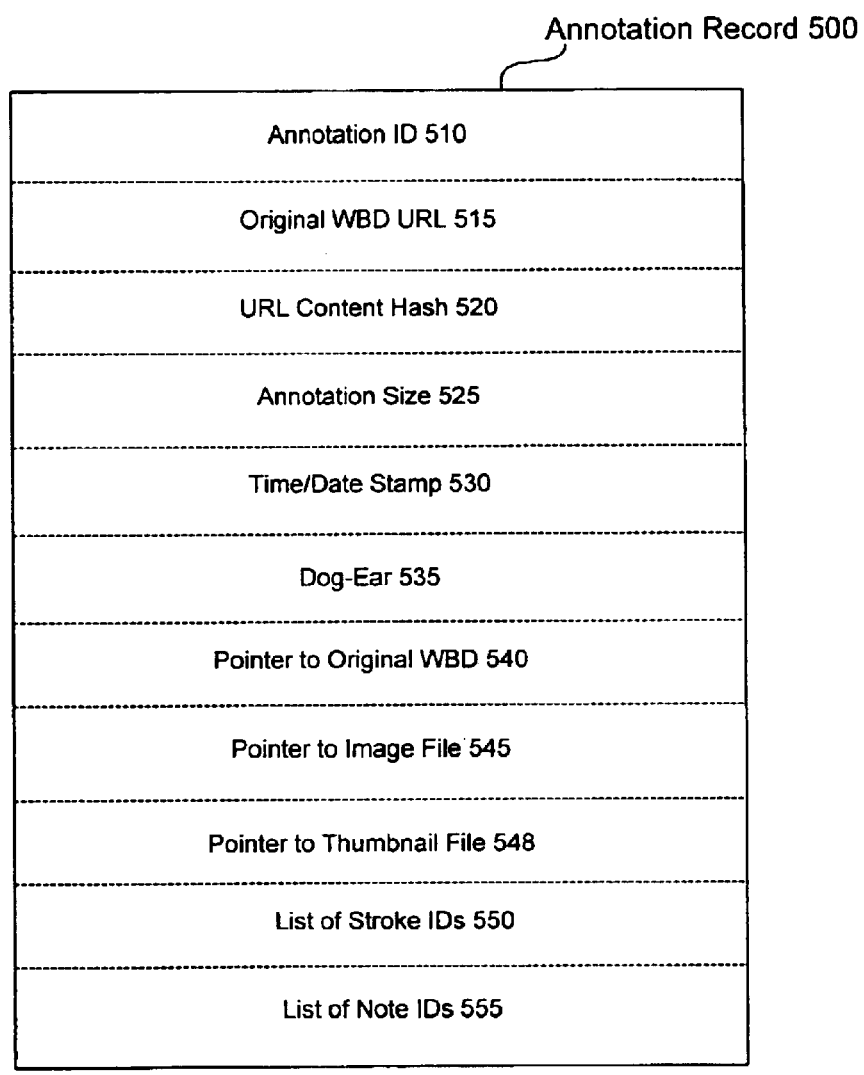
FIG. 5 depicts a data structure of an annotation record that is used to store information in an annotation database in accordance with an exemplary embodiment of the present invention.

FIG. 5 depicts a data structure of an annotation record that is used to store information in annotation database 280 in accordance with an exemplary embodiment of the present invention. Each annotation record contains all pertinent information relating to the appearance and make-up of a single annotated WBD associated with annotation repository 240. In particular, annotation record 500 includes an annotation ID 510 field, an original WBD URL 515 field, a URL content hash 520 field, an annotation size 525 field, a time/data stamp 530 field, a dog-ear 535 field, a pointer to original WBD 540 field, a pointer to image file 545 field, a pointer to thumbnail file 548, a list of stroke IDs 550 field, and a list of note IDs 555 field.

Annotation ID 510 contains an integer value that identifies each annotation record 500 in annotation database 280. Original WBD URL 515 contains an ASCII string representing the Internet address of the unannotated WBD. URL content hash 520 contains an integer value that results from the execution of a standard hash function on the contents of the WBD. Annotation repository 240 uses this value to generate an Internet address for the annotated WBD that can be mapped to the annotated WBD's location in annotation database 280. Annotation size 525 contains an integer value representing the size in bytes of the annotated WBD. Time/date stamp 530 contains an ASCII string representing the time and date that user 200 generated the annotated WBD. Dog-ear 535 stores a boolean value representing whether annotated WBD is marked as a dog-ear ("true") or not ("false"); the default value is "false." Pointer to original WBD 540 stores the file location of the unannotated WBD, pointer to image file 545 stores the file location of the image file containing the appearance of the annotations, and pointer to thumbnail file 548 stores the file location of the image file containing the miniaturized annotated WBD. List of stroke IDs 550 contains a linked list of references to records stored in stroke database 290, while list of note IDs 555 contains a linked list of references to records stored in note database 295.

If a great number of users 200 annotate the same WBD (or similar versions of the same WBD with different advertisements), annotation repository 240 in an exemplary embodiment can conserve disk space by storing "DIFF" files instead of the complete WBD multiple times in annotation database 280. DIFF files are generated by the standard UNIX utility diff, and contain only the different content between similar files or WBDs. Thus, pointer to original WBD 540 could reference the original WBD once, and if subsequent users 200 annotate the same WBD, pointer to original WBD 540 would then reference a much smaller DIFF file that contains the information later used in reconstructing the original WBD.

Figure 6:
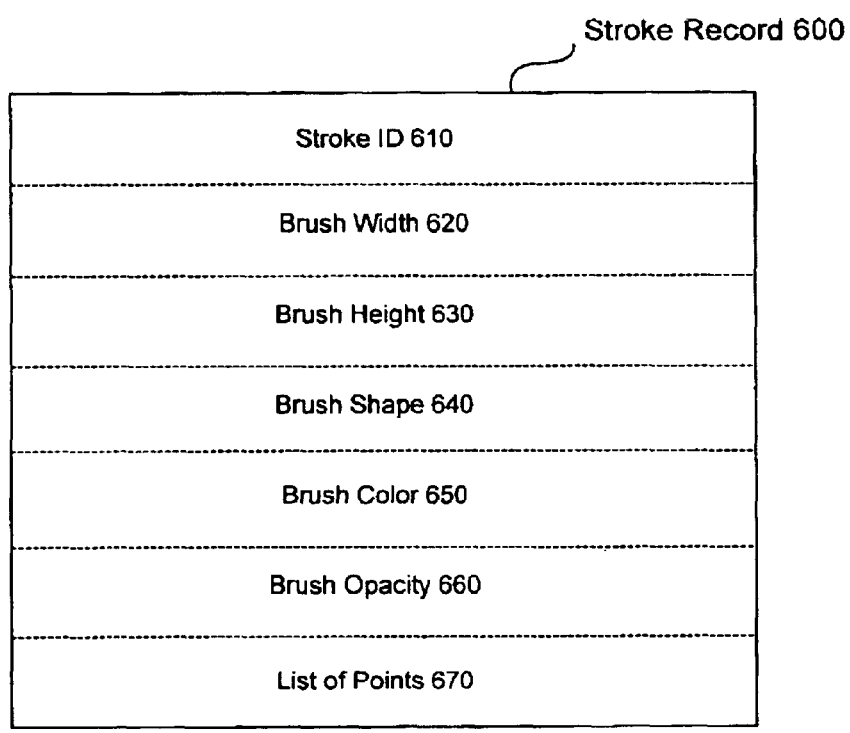
FIG. 6 depicts a data structure of a stroke record that is used to store information in a stroke database in accordance with an exemplary embodiment of the present invention.

FIG. 6 depicts a data structure of a stroke record that is used to store information in stroke database 290 in accordance with an exemplary embodiment of the present invention. Each stroke record contains all pertinent information relating to a single brush stroke generated by a user 200. In particular, stroke record 600 includes a stroke ID 610 field, a brush width 620 field, a brush height 630 field, a brush shape 640 field, a brush color 650 field, a brush opacity 660 field, and a list of points 670 field. Stroke ID 610 contains an integer value that identifies each stroke record 600 in stroke database 290. Brush width 620 and brush height 630 contain integer values that represent the pixel size of the brush width and height, respectively. Brush shape 640 stores an integer enumeration indicating whether the brush is square, round, or otherwise. Brush color 650 stores an integer value representing the red, green and blue components of the brush's color. Brush opacity 660 stores an integer value representing how the brush blends with its background. And list of points 670 contains a list of x and y coordinates of the locations where user 200 draws onto the WBD.

Figure 7:
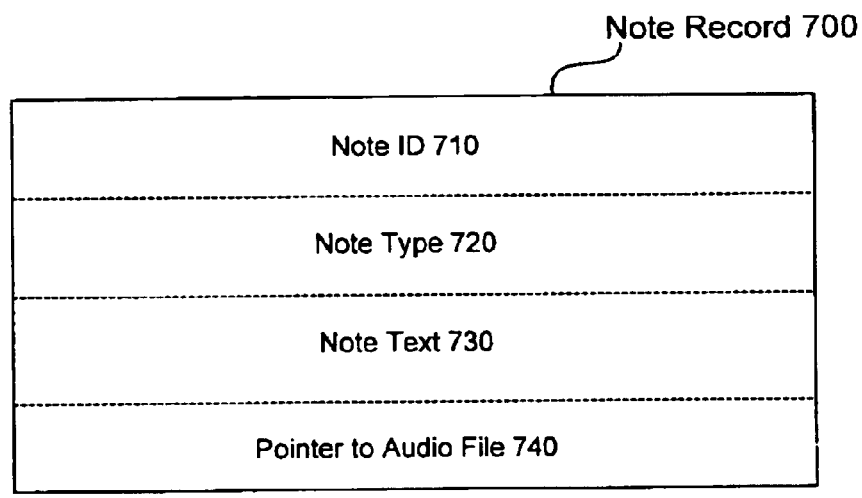
FIG. 7 depicts a data structure of a note record that is used to store information in a note database in accordance with an exemplary embodiment of the present invention.

FIG. 7 depicts a data structure of a note record that is used to store information in note database 295 in accordance with an exemplary embodiment of the present invention. Each note record contains all pertinent information relating to text-based note and audio annotations. In particular, note record 700 includes a note ID 710 field, a note type 720 field, a note text 730 field, and a pointer to audio file 740 field. Note ID 710 contains an integer value that identifies each note record 700 in note database 295. Note type 720 contains a type enumeration that allows for standard yellow sticky notes, "thought" bubbles, rubber stamps, and other types of note appearances. Note text 730 contains an ASCII string that represents the text that user 200 types into the note, and pointer to audio file 740 stores the file location in note database 295 of an audio file associated with note record 700.

Annotation

Figure 8A:
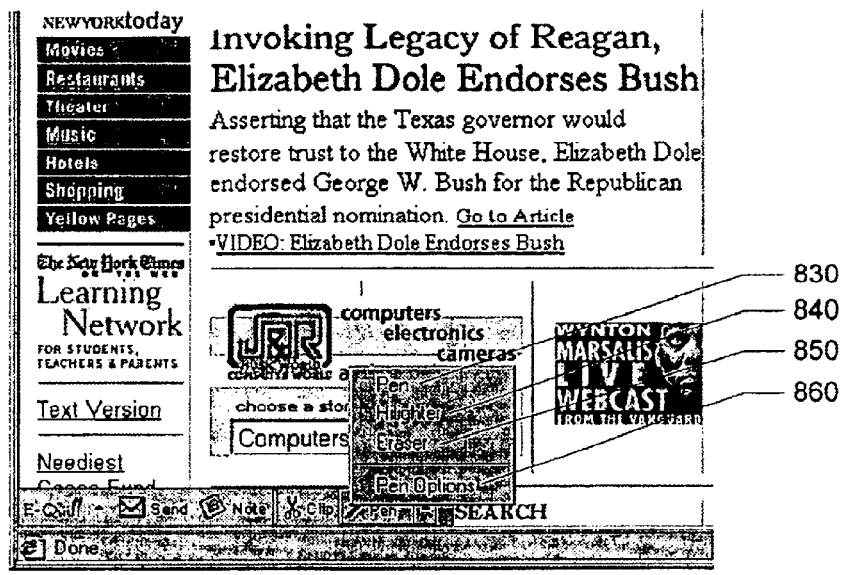
FIG. 8A depicts a pop-up menu from an annotation toolbar in accordance with an exemplary embodiment of the present invention.
Figure 8:
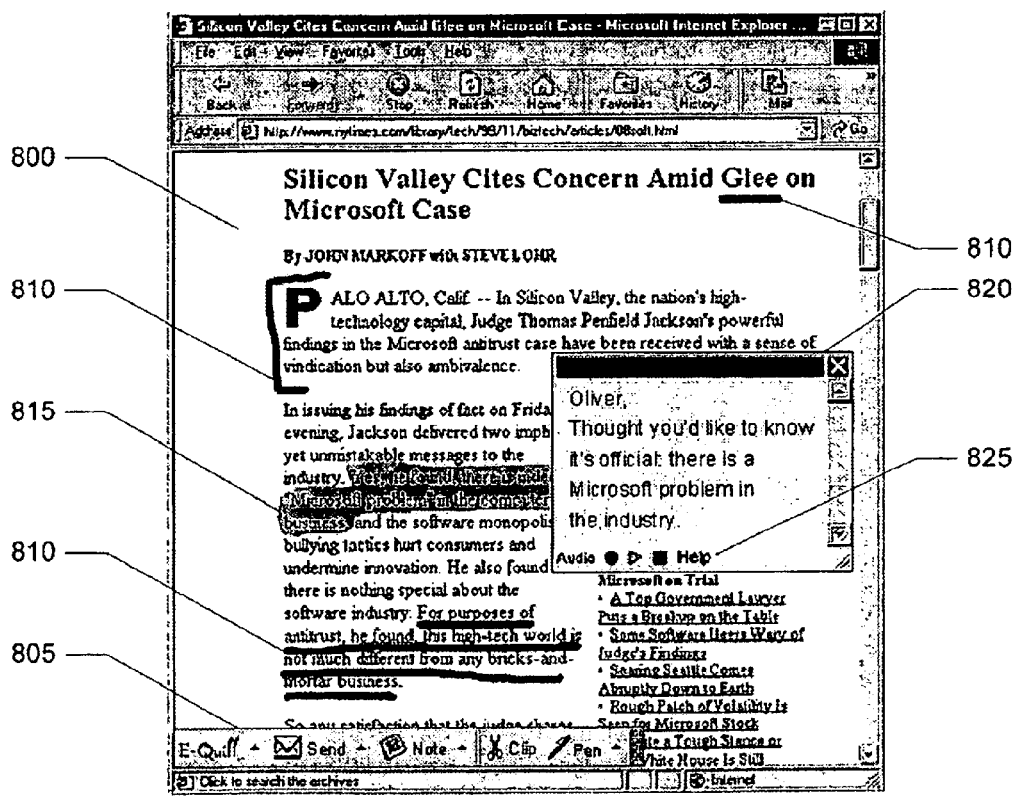
FIG. 8 depicts an annotated WBD in accordance with an exemplary embodiment of the present invention.

FIG. 8 depicts an annotated WBD in accordance with an exemplary embodiment of the present invention. Annotation software 170 enables user 200 to write and draw ink, highlighter and other marks with input device 120, to incorporate text-based notes in small movable windows, and to add audio annotations directly into a WBD displayed by Web browser 160. The result is an annotated WBD 800 that can be sent to other people for viewing over the Internet 230, with or without annotation software 170 installed on the recipients' computers.

According to one embodiment, annotation software 170 displays an annotation toolbar 805 along the bottom edge of Web browser 160. Annotation toolbar 805 allows, for example, user 200 to select an annotation tool and send an annotation link by e-mail. Users 200 may also access their account with annotation repository 240 and change their user preferences via annotation toolbar 805. By clicking on the small arrow next to the pen button on annotation toolbar 805, a small pop-up menu appears, as shown in FIG. 8A, listing pen choice 830, highlighter choice 840, eraser choice 850, and pen options choice 860.

Selecting pen choice 830 can turn input device 120 into an inking device that allows user 200 to underline, bracket, and draw any other type of ink-mark 810 directly onto annotated WBD 800. Selecting highlighter choice 840 can turn input device 120 into an inking device that allows user 200 to draw any type of highlight-mark 815 onto any part of annotated WBD 800. And selecting erase choice 850 can turn input device 120 into an erasing device that allows user 200 to remove any ink-mark 810 or highlight-mark 815 that exists on annotated WBD 800. Pen options choice 860 allows user 200 to customize certain features of the inking device, such as color and shape.

By clicking on the note button on annotation toolbar 805, a small movable note window 820 appears on annotated WBD 800 into which user 200 may type text. The note window 820 also contains along its bottom border an audio annotation menu bar 825, which allows user 200 to easily add an audio dictation to annotated WBD 800. For example, when user 200 clicks on the record button (the round button on audio annotation menu bar 825), annotation software records sound until the stop button is pressed (the square button on audio annotation menu bar 825). To play the recording back, user 200 selects the play button (the triangle button on audio annotation menu bar 825).

Inking Technology

Multiple underlying technologies enable user 200 to annotate a WBD. In one exemplary embodiment, annotation software 170 first freezes the WBD, so that resizing Web browser 160 after annotating the WBD will not affect the positioning of the annotations with respect to the underlying WBD. Annotation software 170 then allows user 200 to annotate into Web browser 160 by inserting on top of the WBD a transparent image file that contains the annotations. And finally, annotation software 170 allows browser events to pass through the annotation image file so that user 200 has complete access to the underlying WBD. These technologies are integrated into the physical WBD, so that annotated WBD 800 may be viewed by anyone with a Web browser 160, with or without annotation software 170.

Freezing WBDs

Since annotations are overlaid on the WBD, if, due to resizing, Web browser 160 reflows text underneath the annotations, the annotation will not match up with the underlying WBD. Thus, freezing WBD content prevents Web browser 160 from re-flowing text and images when user 200 resizes Web browser 160, so that the positioning of any annotations will remain fixed with respect to the underlying WBD.

Figure 9:
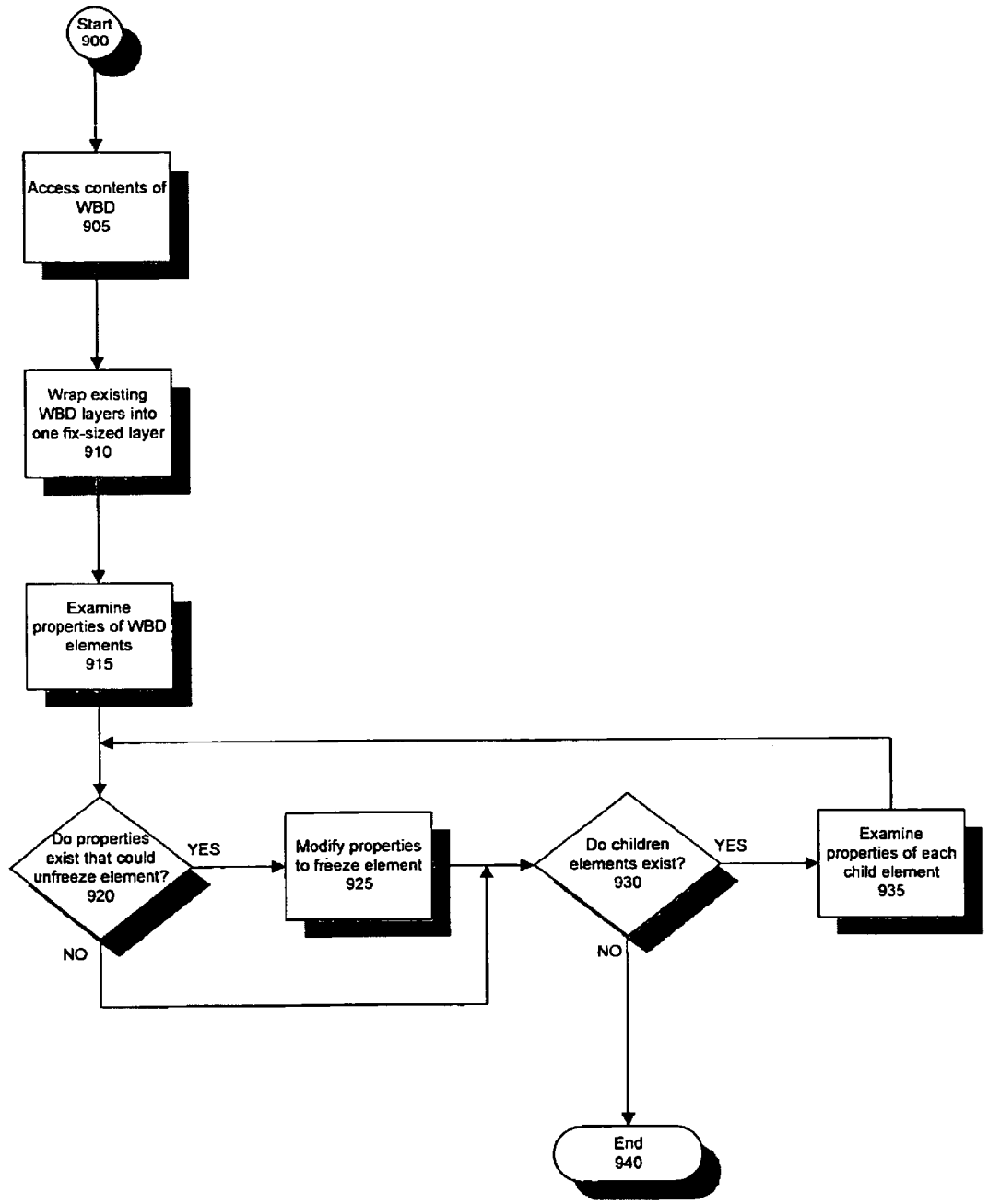
FIG. 9 is a flowchart of steps for freezing WBD content in accordance with an exemplary embodiment of the present invention.

FIG. 9 is a flowchart of steps for freezing WBD content in accordance with an exemplary embodiment of the present invention. To freeze a WBD in general, annotation software 170 first gains access to the content of the WBD (step 905). Since some WBDs are composed of different layers that may behave differently upon browser resizing, annotation software 170 wraps the existing WBD layers into one fix-sized layer (step 910). With all the layers wrapped, the next task is to examine the properties of the WBD elements (step 915). WBD elements, which encompass any content on the WBD (e.g., single word, paragraph, image, buttons implemented in JavaScript), may contain certain properties that cause the element to move during browser resizing. For instance, an element property may require the element to stay fixed to the size of the WBD no matter how the browser is sized. Therefore, if a WBD element contains properties that cause that element to become unfrozen ("yes" branch of step 920), then those properties are modified so that the element remains in a fixed position through browser resizing (step 925). Since WBD elements are organized in a tree-like fashion, with the root element at the top and all children below, the next inquiry is whether children elements exist (step 930). If children elements exist, their properties are similarly examined (step 935) and, if appropriate, modified (step 925), and the process repeats until all elements have been examined ("no" branch of step 930).

One exemplary embodiment in accordance with the present invention uses the Internet Explorer ("IE") implementation of the Document Object Model ("DOM") in combination with Cascading Style Sheets ("CSS") and Dynamic-HTML ("DHTML") World Wide Web technology. The Document Object Model is a platform-neutral and language-neutral specification that allows programs and scripts to dynamically access and update the content, structure and style of WBDs. CSS is a standard approved by the World-Wide-Web Consortium that allows WBD authors greater flexibility in specifying how their WBDs should be formatted inside a browser. For example, these style sheets make it possible to insert elements on a WBD that "snap" to the sides of a browser, akin to left or right justified text, so that they move with the browser window as it is resized. DHTML functionality allows WBD authors to create multiple overlaid layers of HTML inside a single WBD, and also enables WBDs to alter their content programmatically.

The method according to this embodiment starts at step 900. Through a combination of C++ and JavaScript, annotation software 170 employs the DOM to access the contents of a WBD (step 905) by using the document.body.innerHTML property. Annotation software 170 wraps the existing DHTML layers to a fix-sized DHTML layer (step 910) by inserting a <DIV>(new DHTML layer) tag before the contents of the original WBD and setting its CSS STYLE properties with "position:absolute; width:<width_of_ browser>". A close <DIV> tag is inserted at the end of the WBD's document.body element to keep the WBD valid. Inserting the DIV layer effectively tells IE to render (i.e., lay out the contents of the WBD into the browser) all HTML inside the DIV layer within a particular width.

Adding the DIV tag freezes a significant number of WBDs in their entirety, but WBDs that utilize CSS or DHTML may still contain unfrozen elements. To ensure that every element in the tree of WBD elements remains frozen upon window resizing, annotation software 170 examines the properties of the document.body element (step 915), which is the root of the tree. It determines if this body element contains any properties that could cause the element to become unfrozen (step 920), such as "position:absolute" or "centered". The "position:absolute" property could cause an element to become unfrozen because it would not be positioned relative to the newly inserted fixed-sized DIV layer. If no such properties exist ("no" branch of step 920), annotation software 170 proceeds to step 930 to examine any children elements. If these properties do exist ("yes" branch of step 920), they are modified to freeze the element (step 925) by using the "position:relative" or "normal" properties. If no children elements are found to exist ("no" branch of step 930), the method terminates (step 940). If any children elements do exist ("yes" branch of step 930), their properties are examined (step 935) and the same process (step 920 and step 925) is recursively repeated until all children elements in the tree have been examined and, if applicable, modified.

Annotating into the Browser

Since most modern Web browsers internally maintain their own graphics contexts (buffers that enable the browsers to draw to the screen) and HTML rendering code, browser plug-in developers currently have no ability to enable drawing directly into a browser. Thus, the present invention overlays an active image file onto the WBD to simulate drawing directly into the browser, as shown in FIG. 10.

Figure 10:
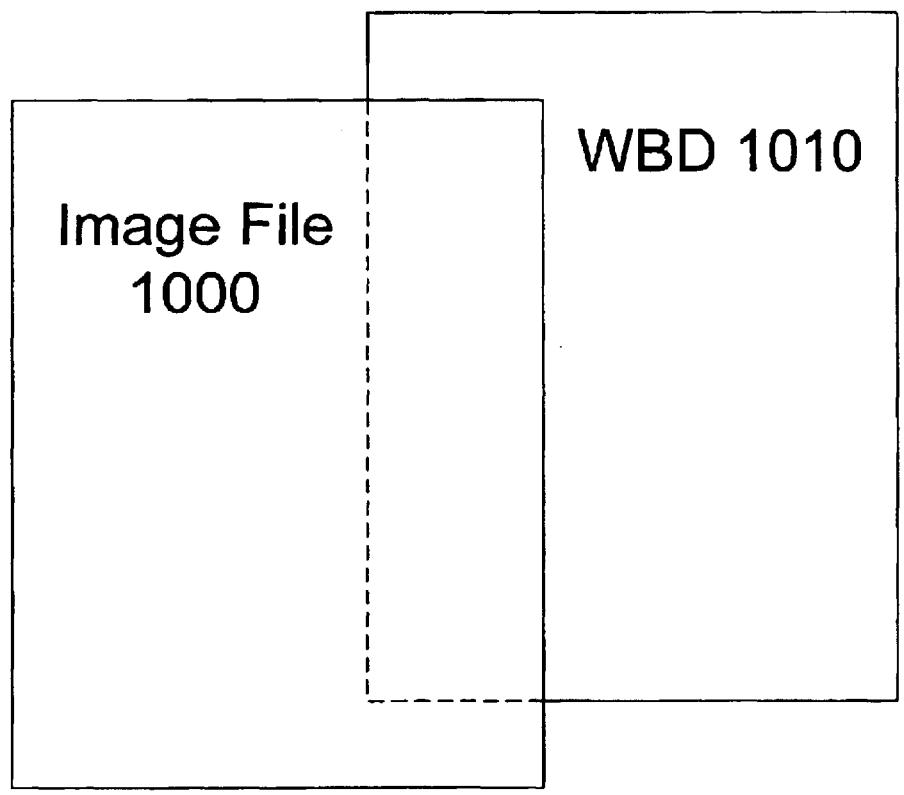
FIG. 10 depicts the imposition of an image file onto a WBD in accordance with an exemplary embodiment of the present invention.
Figure 11:
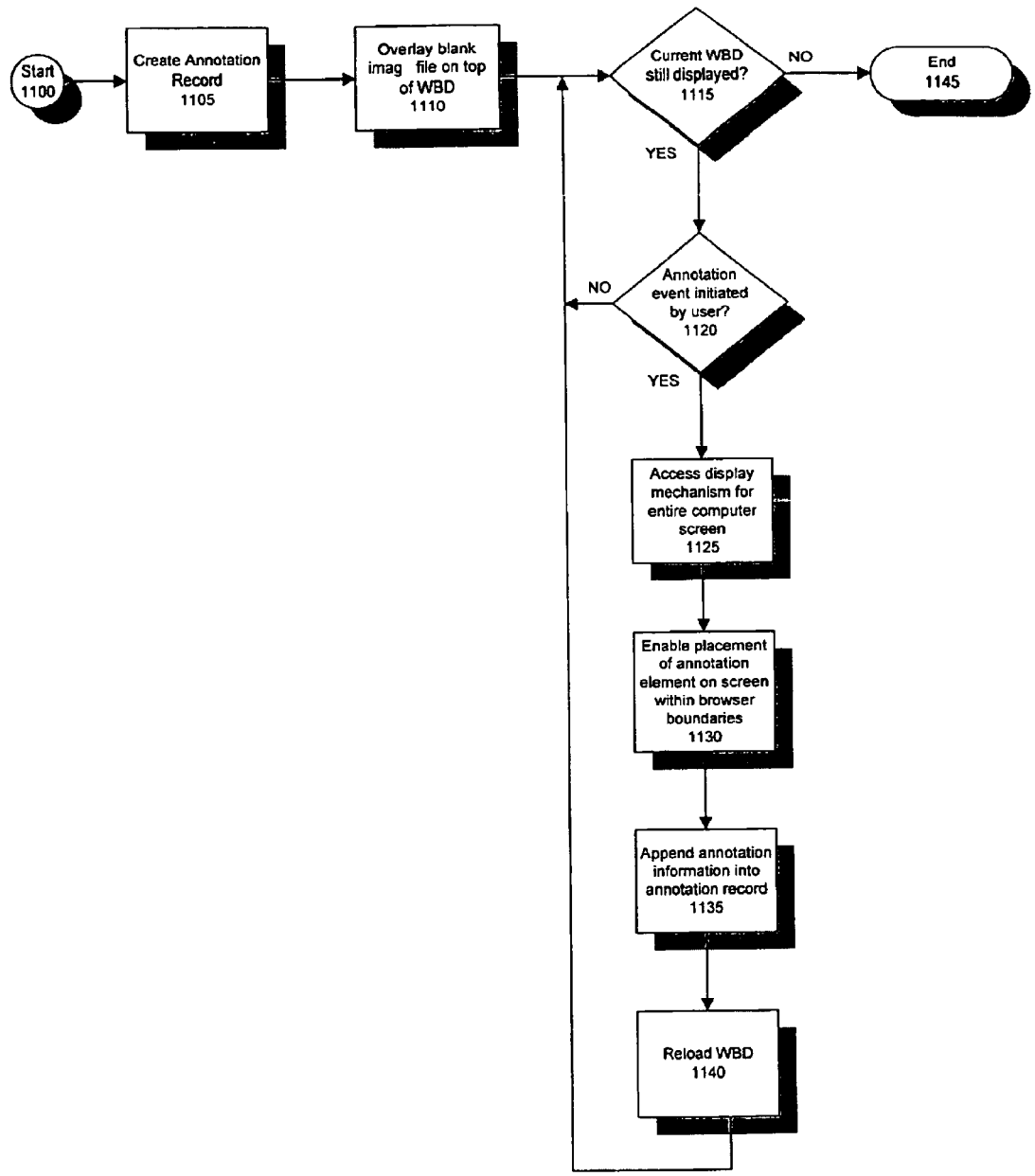
FIG. 11 is a flowchart of steps for annotating into a Web browser in accordance with an exemplary embodiment of the present invention.

FIG. 11 is a flowchart of steps for drawing into a Web browser 160 in accordance with an exemplary embodiment of the present invention. In general, the method starts when user 200 views a new WBD 1010 that user 200 would like to annotate (step 1160). Annotation software 170 creates a new annotation record 500 to capture information about user 200's annotations on WBD 1010 (step 1105). Annotation software 170 next overlays a blank image file 1000 on top of a WBD 1010(step 1110), as shown in FIG. 10. As long as the current WBD 1010 is still displayed in Web browser 160 ("yes" branch of step 1115), annotation software 170 waits for user 200 to initiate an annotation event, which comprises drawing, adding a text note, or adding an audio note to WBD 1010 (step 1120). Once the annotation event is initiated ("yes" branch of step 1120), annotation software 170 accesses the display mechanism for the entire computer screen (step 1125). Since this would enable user 200 to place the annotation element anywhere on the entire computer screen, annotation software 170 restricts user 200's annotation to the boundaries of Web browser 160 (step 1130). After user 200 completes the annotation event, technical annotation information (e.g., the annotation image, the data representing annotation location and attributes, etc.) is appended to annotation record 500 (step 1135). In this step, the annotation image is appended to image file 1000, so when annotation software 170 signals Web browser 160 to reload WBD 1010 (step 1140), the newly integrated annotated WBD 800 is displayed. This seamless process continues until user 200 leaves the annotated WBD 800 ("no" branch of step 1115), at which time the process ends (step 1145).

One exemplary embodiment in accordance with the present invention uses the IE implementation of the DOM in combination with CSS and DHTML technology. The method starts when user 200 views a new WBD 1010 that user 200 would like to annotate (step 1100). When user 200 presses one of the buttons on annotation toolbar 805, annotation software 170 creates a new annotation record 500 in annotation database 280 to capture information about user 200's annotations on WBD 1010 (step 1105). Note that although annotation software 170 sends all annotation-related information to annotation repository 240, this information may also be stored in temporary storage device 140 or resident storage device 150 for efficiency reasons. At this time, annotation software 170 creates a unique identifier for WBD 1010 in the annotation ID 510 field of annotation record 500. Annotation software 170 places the Internet address of unannotated WBD 1010 in the original WBD URL 515 field, places a time and date stamp into time/date stamp 530 field, and copies WBD 1010 into annotation database 280, storing its location in the pointer to original WBD 540 field. Annotation software 170 also creates in annotation database 280 a default-sized image file, and stores its location in pointer to image file 545.

Annotation software 170 next overlays the standard-format (e.g., tiff, gif, or png) blank image file 1000 on top of WBD 1010 (step 1110), as shown in FIG. 10. This is accomplished by creating a new DHTML layer in WBD 1010 using the <DIV>HTML tag, and inserting a standard <IMG> HTML tag in the new DHTML layer to incorporate the blank image file 1000. The image file 1000 is set to be transparent in locations where no annotation is positioned. Transparency is a standard provision of many file formats, including those enumerated above.

As long as the current WBD 1010 is still displayed in Web browser 160 ("yes" branch of step 1115), annotation software 170 waits for user 200 to initiate an annotation event, which comprises drawing an ink-mark 810, drawing a highlight-mark 815, adding a text annotation or adding an audio dictation (step 1120). Once the annotation event is initiated ("yes" branch of step 1120), annotation software 170 acquires the global graphics context of the entire computer screen (step 1125). This global graphics context is accessible because it is maintained by the operating system, which may comprise, among others, Microsoft Windows or NT, MacOS, or some variation of UNIX. Since this access would enable user 200 to annotate anywhere on the screen through standard operating system calls, annotation software 170 clips user 200's annotation element so that it remains within the boundaries of Web browser 160 (step 1130).

After user 200 initiates an annotation event, annotation software 170 appends technical information about the annotation into annotation record 500 (step 1135). In this step, the annotation image is appended to image file 1000 referenced by a pointer to image file 545. Annotation software 170 positions the annotation element so that the location of the drawing marks in image file 1000 corresponds to the location of the drawing marks that user 200 made on the screen.

Annotation software 170 creates a new stroke record 600 in stroke database 290 for every mark that user 200 draws into Web browser 160. For each stroke record 600, annotation software 170 generates a unique ID number for stroke ID 610, and adds that ID number to the list of stroke IDs 550 of the associated annotation record 500. Annotation repository 240 stores the appropriate values for brush width 620, brush height 630, brush shape 640, brush color 650, and brush opacity 660, and stores the data points or coordinates of the annotation stroke in the list of points 670. In an exemplary embodiment, annotation software 170 may store into stroke record 600 information extracted through the DOM like the current scroll position of WBD 1010 and the size of Web browser 200's window, along with number of direction changes, length of stroke, horizontal and vertical dot products, and time elapsed from start to end of stroke.

Annotation software 170 creates a new note record 700 in note database 295 for every text-based note or audio annotation that user 200 creates. For each note record 700, annotation software 170 generates a unique 1D number for note ID 710, and adds that ID number to the list of note IDs 555 of the associated annotation record 500. Annotation repository 240 stores the type of note in note type 720, and the text of the note in note text 730. If user 200 associates an audio annotation with the note, the audio annotation is stored in an audio file in streaming audio format (e.g., .wav., .mps, RealAudio) in note database 295, and its location is stored in a pointer to audio file 740.

Since image file 1000, which is overlaid on top of WBD 1010, is updated with the new annotation image, when annotation software 170 signals Web browser 160 to reload WBD 1010 (step 1140), the newly integrated annotated WBD 800 is displayed. This process continues until user 200 leaves the annotated WBD 800 ("no" branch of step 1115), at which time the process ends (step 1145). This entire process from on-screen ink to in-browser ink is seamless, and transparent to user 200.

Passing Browser Events Through Annotations

As is known in the art, standards-compliant Web browsers 160 are required to pass events (e.g., keyboard strokes, mouse clicks, etc.) from the lowest element in the WBD's element tree, up the tree, and eventually to the root element (i.e., document.body element). Since the image file 1000 created by annotation software 170 overlays the prior topmost WBD layer, it blocks input device 120 events (e.g., mouse clicks) from reaching the original unannotated WBD 1010. Thus, the present invention "burns a hole" centered around user 200's input device pointer (i.e., cursor) in the image file 1000 layer, so that input device 120 events can find their way to original WBD 1010 below.

FIG. 13 is a flowchart of steps for passing Web browser events through annotations in accordance with an exemplary embodiment of the present invention. This method commences when user. 200 views a new WBD 1010 (step 1300). Annotation software 170 inserts multiple versions of the same image file 1000 on top of WBD 1010 (step 1305) and then starts to monitor input device 120 movements (step 1310). When input device 120 moves (step 1315), annotation software 170 dynamically clips the viewable rectangular portion of each image file 1000 in such a way that no part of any image file 1000 is visible at the point directly beneath input device 120 (step 1320). The clipping rectangle of image file 1000 determines which portion of image file 1000 is visible. This is illustrated in FIG. 12, in which the four clipping rectangles 1200a–1200d of image file 1000 are arranged so that no image projects through the hole 1210, which represents the minuscule point directly beneath input device 120. Since no image projects through the hole 1210 beneath input device 120, input device 120 events are able to reach the original unannotated WBD 1010. This method of FIG. 13 does not end, it just restarts when user 200 views a different WBD 1010.

One exemplary mouse-driven embodiment in accordance with the present invention uses the IE implementation of the DOM in combination with CSS and DHTML technology. This method commences when user 200 views a new WBD 1010 (step 1300). In order to "burn a hole" into a DHTML layer, annotation software 170 initially creates four identical DHTML layers containing the full image file 1000, and inserts them into WBD 1010 (step 1305). The four layers are inserted by using the <DIV> tag, and, using CSS properties, they are positioned absolutely at the top-left corner of WBD 1010 so that they cannot be resized. Annotation software 170 then inserts a hook into WBD 1010's onmousemove( ) handler (step 1310). When Web browser 160 notifies annotation software 170 through this handler that the mouse has moved (step 1315), annotation software 170 dynamically changes, through DHTML, the clip property of the four instantiations of image file 1000 so that no image is displayed directly underneath the mouse (step 1320). This method does not end, it just restarts when user 200 views a different WBD 1010.

Alternative Annotation Method

In an alternative embodiment, the present invention still freezes the WBD as an initial step, but the WBD is annotated through the use of component object technology. Component objects, or control objects, are part of a component framework that enables these objects to become embedded within documents (including WBDs) to communicate with one another and with the framework. There are numerous component object technologies; some exist for multiple operating systems and browsers, and others exist for single operating systems and browsers. Component object framework implementations vary widely.

Figure 14:
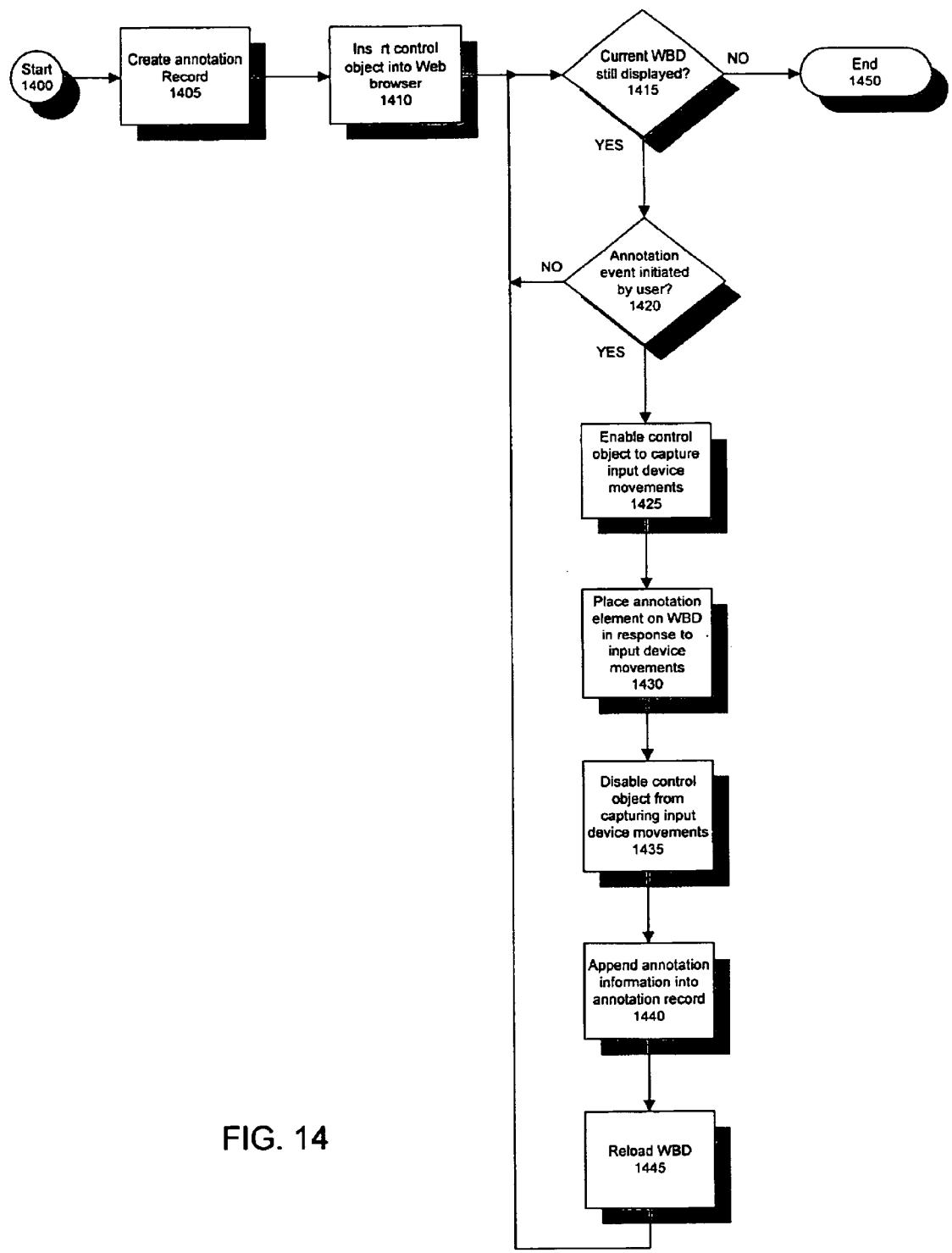
FIG. 14 is a flowchart of steps for drawing into a Web browser via a control object in accordance with an exemplary embodiment of the present invention.

FIG. 14 is a flowchart of steps for drawing into a Web browser 160 via a control object in accordance with an exemplary embodiment of the present invention. In general, the method starts when user 200 views a new WBD 1010 that user 200 would like to annotate (step 1400).

Annotation software 170 creates a new annotation record 500 to capture information about user 200's annotations on WBD 1010 (step 1405). Annotation software 170 next inserts a control object into Web browser 160 (step 1410). As long as the current WBD 1010 is still displayed in Web browser 160 ("yes" branch of step 1415), annotation software 170 waits for user 200 to initiate an annotation event, which comprises drawing, adding a text note, or adding an audio note to WBD 1010 (step 1420). Once the annotation event is initiated ("yes" branch of step 1420), annotation software 170 enables the control object to capture input device 120's movements (step 1425), and places the annotation element on WBD 1010 in response to input device 120's movements (step 1430). After user 200 completes the annotation event, annotation software 170 disables the control object from capturing input device 120's movements (step 1435), and appends technical annotation information (e.g., vector stroke information, data representing annotation attributes, etc.) to annotation record 500 (step 1440). When annotation software 170 signals Web browser 160 to reload WBD 1010 (step 1445), the newly annotated WBD 800 is displayed. This seamless process continues until user 200 leaves the annotated WBD 800 ("no" branch of step 1415), at which time the process ends (step 1450).

One exemplary embodiment in accordance with the present invention makes use of ActiveX control technologies available for IE. ActiveX control technologies build on previous Microsoft Windows technologies, including COM ("Component Object Model") and OLE (Object Linking and Embedding"), and allow programmers to create "Internet aware" controls. A control in the most basic sense is a GUI ("graphical user interface") widget such as a button, scrollbar, or text entry area. Normally each control has a separate window, which is a rectangular portion of the computer screen in which drawing can be performed. However, ActiveX controls can be "windowless," which result in unusually shaped controls and transparency. This transparency allows browser events to pass directly through the control, without the "hole burning" techniques explained above.

The method according to this embodiment starts when user 200 views a new WBD 1010 that user 200 would like to annotate (step 1400). When user 200 presses one of the buttons on annotation toolbar 805, annotation software 170 creates a new annotation record 500 in annotation database 280 to capture information about user 200's annotations on WBD 1010 (step 1405). Note that although annotation software 170 sends all annotation-related information to annotation repository 240, this information may also be stored in temporary storage device 140 or resident storage device 150 for efficiency reasons. At this time, annotation software 170 creates a unique identifier for WBD 1010 in the annotation ID 510 field of annotation record 500. Annotation software 170 places the Internet address of unannotated WBD 1010 in the original WBD URL 515 field, places a time and date stamp into time/date stamp 530 field, and copies WBD 1010 into annotation database 280, storing its location in the pointer to original WBD 540 field.

Annotation software 170 next inserts a control object into Web browser 160 (step 1410). This is accomplished through COM interfaces supported by IE. Annotation software 170 initially sets the ActiveX control object to be completely transparent, and positions it at the top-left corner of Web browser 160. The initial size of the control is arbitrarily small (e.g., 20 pixels square).

As long as the current WBD 1010 is still displayed in Web browser 160 ("yes" branch of step 1415), annotation software 170 waits for user 200 to initiate an annotation event, which comprises drawing an ink-mark 810, drawing a highlight-mark 815, adding a text annotation or adding an audio dictation (step 1420). Once the annotation event is initiated ("yes" branch of step 1420), annotation software 170 enables the control object to capture input device 120's movements through ActiveX control's EnableCapture method (step 1425). As user 200 moves the enabled input device 120, the ActiveX control inherently resizes itself as necessary to fit all of user 200's strokes inside its boundaries. In addition, as user 200 drags input device 120, the ActiveX object redraws itself to reflect the new lines that are drawn. Using standard method calls to the ActiveX control, annotation software 170 places the annotation element onto the computer screen in response to input device 120's movements (step 1430), and then disables the control object from capturing input device 120 movements (step 1435).

After user 200 initiates an annotation event, annotation software 170 appends technical information about the annotation into annotation record 500 (step 1440). In this embodiment, annotation software 170 does not need to store an annotation image file to be superimposed over the actual WBD. Instead, the ActiveX object uses the vector stroke data stored in stroke database 290 to re-form, on screen, the stroke image. However, since this implementation is currently limited to Microsoft Window's machines, annotation software 170 may still construct the appropriate image file for storage in annotation repository 240, in order to allow any person on any machine access to the annotated WBD's 800.

In step 1440, annotation software 170 creates a new stroke record 600 in stroke database 290 for every mark that user 200 draws into Web browser 160. For each stroke record 600, annotation software 170 generates a unique ID number for stroke ID 610, and adds that ID number to the list of stroke IDs 550 of the associated annotation record 500. Annotation repository 240 stores the appropriate values for brush width 620, brush height 630, brush shape 640, brush color 650, and brush opacity 660, and stores the data points or coordinates of the annotation stroke in the list of points 670. In an exemplary embodiment, annotation software 170 may store into stroke record 600 information extracted through the DOM like the current scroll position of WBD 1010 and the size of Web browser 200's window, along with number of direction changes, length of stroke, horizontal and vertical dot products, and time elapsed from start to end of stroke.

Annotation software 170 creates a new note record 700 in note database 295 for every text-based note or audio annotation that user 200 creates. For each note record 700, annotation software 170 generates a unique ID number for note ID 710, and adds that ID number to the list of note IDs 555 of the associated annotation record 500. Annotation repository 240 stores the type of note in note type 720, and the text of the note in note text 730. If user 200 associates an audio annotation with the note, the audio annotation is stored in an audio file in streaming audio format (e.g., .wav., .mp3, RealAudio) in note database 295, and its location is stored in pointer to audio file 740.

In step 1445, annotation software 170 signals Web browser 160 to reload WBD 1010, causing the ActiveX object to use the vector stroke data to display the newly annotated WBD 800. This entire process continues until user 200 leaves the annotated WBD 800 ("no" branch of step 1415), at which time the process ends (step 1450). The process from on-screen ink to in-browser ink is seamless, and transparent to user 200.

ORGANIZATIONAL TOOLS

Collecting Annotated Information

The present invention acts as an online notebook/scrapbook in the way it collects and organizes WBDs. Standard browsers enable WBDs to be collected (e.g., via "favorites" or "bookmarks"), but annotation repository 240 allows users 200 to mark WBDs for collection simply by adding annotations. Any time user 200 marks a WBD, annotation software 170 sends the information from user computer 100 to annotation repository 240 in the background, so as not to disrupt user 200 from browsing the Internet 230.

Figure 15:
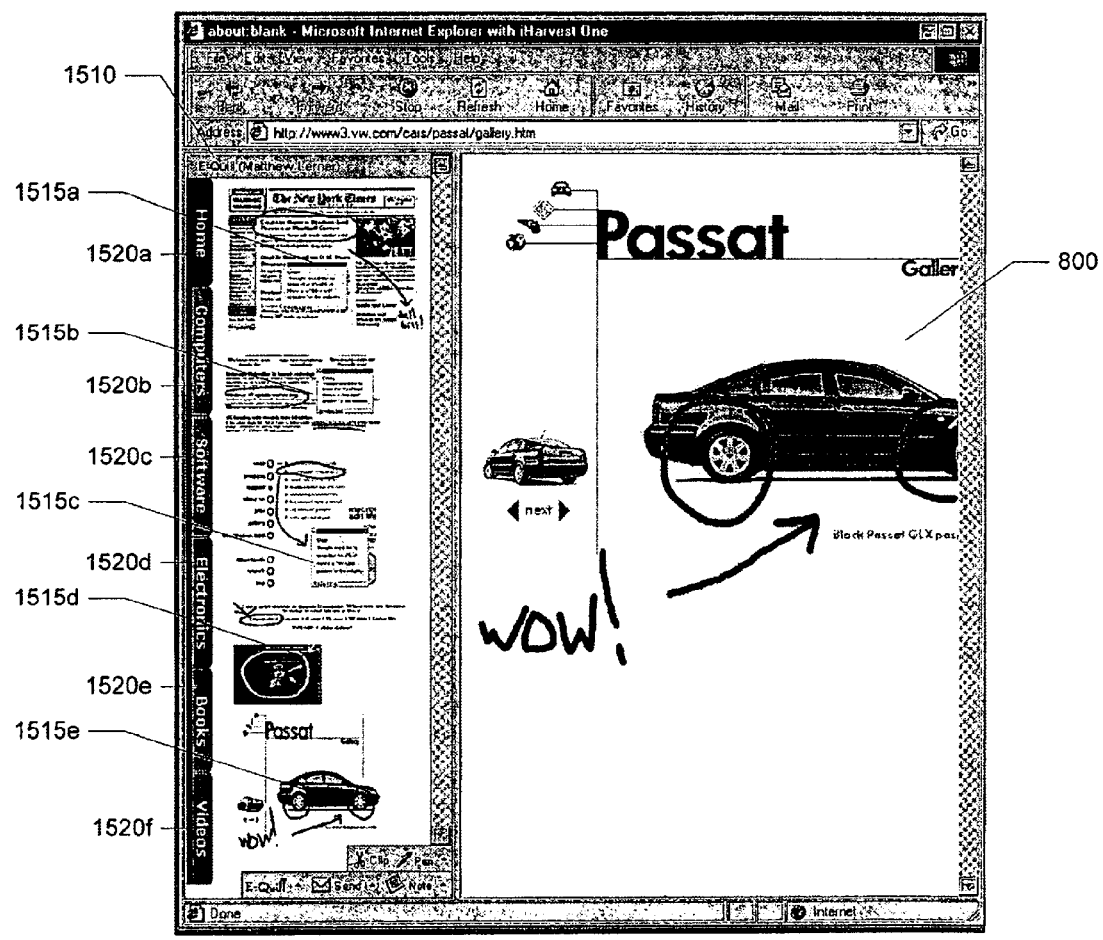
FIG. 15 illustrates a thumbnail margin in accordance with an exemplary embodiment of the present invention.

Annotation software 170 provides user 200 with a margin inside Web browser 160 in which to group thumbnails (i.e., miniaturized images) of annotated WBDs 800. FIG. 15 illustrates a thumbnail margin in accordance with an exemplary embodiment of the present invention. After user 200 completes annotating a WBD, annotation software 170 automatically generates a thumbnail 1515 of the newly annotated WBD 800 and displays it in margin 1510. User 200 may assign each thumbnail 1515 a user-defined category 1520, which is listed along the left border of margin 1510. In this embodiment, annotation repository 240 generates each thumbnail using standard 2D image processing techniques, and stores each file containing the thumbnail image into annotation database 280, along with the file location in pointer to thumbnail file 548 of the associated annotation record 500. Annotation repository 240 stores the user-defined category in category 420 of the associated folder record 400, making sure the associated annotation record 500 is linked to the list of annotation IDs 430.

Figure 15A:
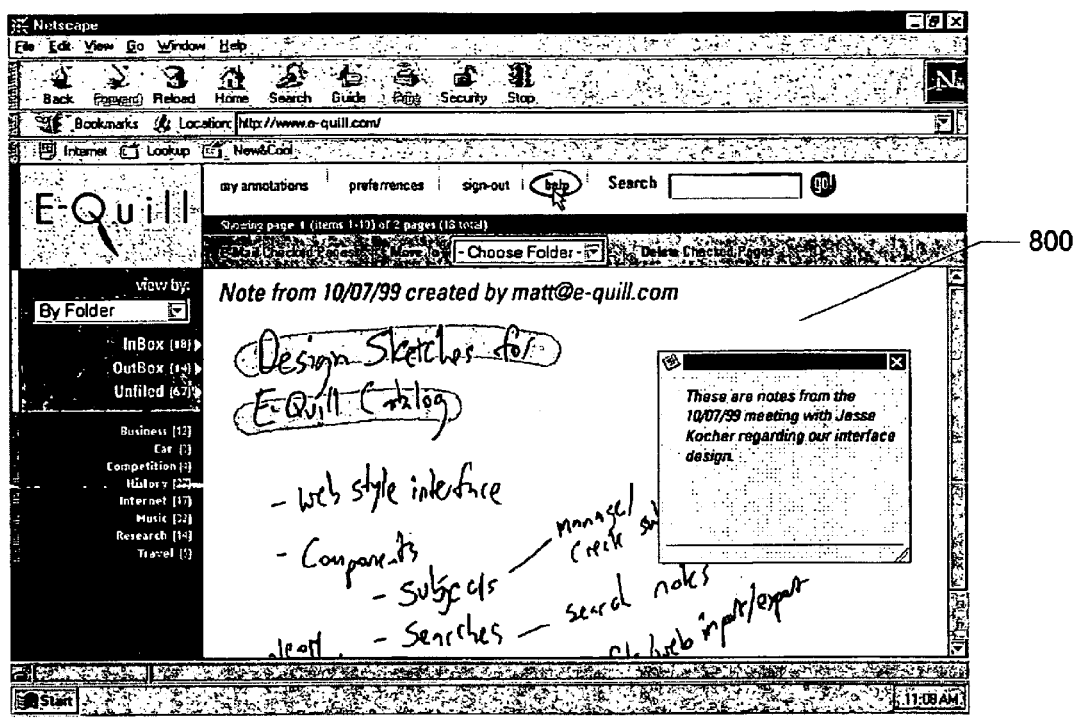
FIG. 15A illustrates an online notebook/scrapbook in accordance with an exemplary embodiment of the present invention.

The present invention also allows users 200 to annotate blank WBDs. Annotating blank WBDs is no different that annotating WBDs with preexisting content. As shown in FIG. 15A, which is an exemplary embodiment of an online notebook/scrapbook, users 200 have a limitless forum in which to collect, organize and store their notes. As with regular annotated WBDs 800, these notes may comprise colored marks, highlighting, text-based windows and audio annotations. The notes may be placed into any user-defined category, and may be viewed and searched as described below.

Viewing/Searching by Inking Technology

Figure 16:
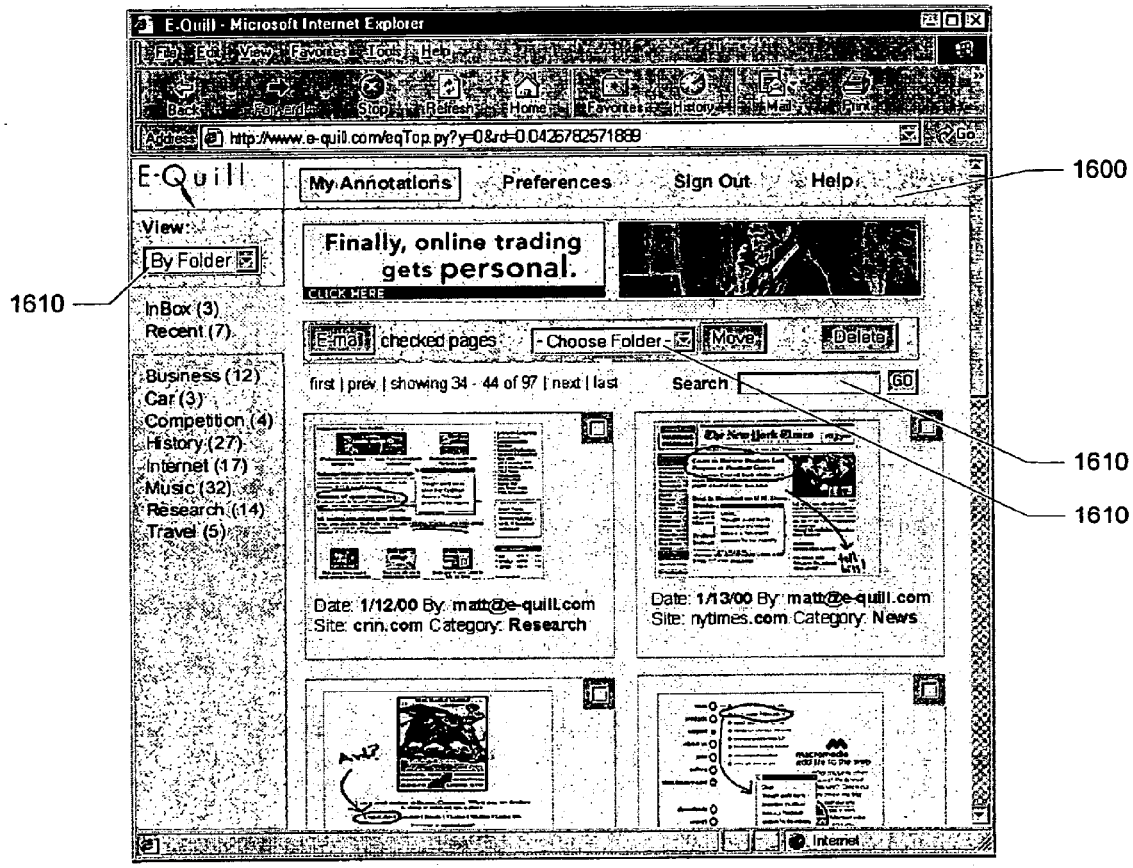
FIG. 16 illustrates a search interface in accordance with an exemplary embodiment of the present invention.

The present invention provides user 200 with an intuitive Web-based interface for accessing, viewing and searching the WBDs that user 200 has annotated. This interface enables user 200 to search any annotated WBD 800 by its annotation attributes, which include, among others, time of annotation (e.g., last week, today, etc.), color of ink-mark 810, shape of annotation (e.g., user-defined star or underline), category 1520, author, and Website. An embodiment of the search interface 1600 in accordance with the present invention is illustrated in FIG. 16.

According to one embodiment, annotation software 170 implements viewing and searching of annotated WBDs 800 by comparing user 200's search parameters 1610, which user 200 enters through search interface 1600 of Web browser 160, with the associated fields of the relevant records in annotation repository 240. For example, if user 200 wants to view all annotated WBDs 800 assigned a specific category 1520, annotation software 170 searches the category 420 field of folder record 400 in user folder database 270 for matches. If category 420 matches the search criteria, annotation software 170 displays thumbnails 1515 of the matched annotated WBDs 800 by following the pointer to thumbnail files 548 of the annotation records 500 linked to the associated list of annotation IDs 430. Similarly, if user 200 wants to view all annotated WBD's 800 containing a specific ink-mark 810 (e.g., an asterisk or star), annotation software 170 receives the ink-mark 810 from user 200 through search interface 1600, stores its graphical attributes in a temporary stroke record 6900 in temporary storage device 140, and searches the stroke records 600 in stroke database 290 for matches. If stroke records 600 match the search criteria, annotation software 170 again displays thumbnails 1515 of the matched annotated WBDs 800 in Web browser 160.

Sharing Annotations

The present invention also allows users 200 to send an annotated WBD 800 to someone else over the Internet 230. By clicking on the send button on annotation toolbar 805, user 200 can e-mail an annotated WBD 800 link to others so they can view annotated WBD 800 directly on their Web browser 160, even if the others do not have annotation software 170. In one embodiment, annotation software 170 creates a unique Internet address for annotated WBD 800 and inserts it into a draft of an e-mail. Annotation software 170 generates this address by executing a standard hash function on the contents of the annotated WBD 800 and stores it in URL content hash 520 of the associated annotation record 500. This address is mapped to the annotated WBD's 800 location in annotation database 280. User 200 may then type a message in the e-mail, and send both the message and the link to someone else. When the recipient clicks on the link to view annotated WBD 800, annotation repository 240 receives the request and sends annotated WBD 800 to the recipient's Web browser 160 for viewing. Annotated WBD 800 still contains its original active links and properties, and recipient does not need annotation software 170 installed to view annotated WBD 800.

INTERFACE TECHNIQUES

The present invention provides users with many novel interface techniques. These techniques include using dog-ears and its associated navigation tools, splitting pages, turning pages, selecting and copying various portions of a WBD, and marking menus suited for right-handed or left-handed users 200.

Gesture Recognition

Most of the interface techniques employed by the present invention involve gestures, which are strokes made by input device 120 that issue commands to Web browser 160. The present invention utilizes three types of gestures:single stroke gestures, multi-stroke gestures, and dynamic gestures. Dynamic gestures refer to strokes that issue commands during the drawing of the stroke.

Figure 17:
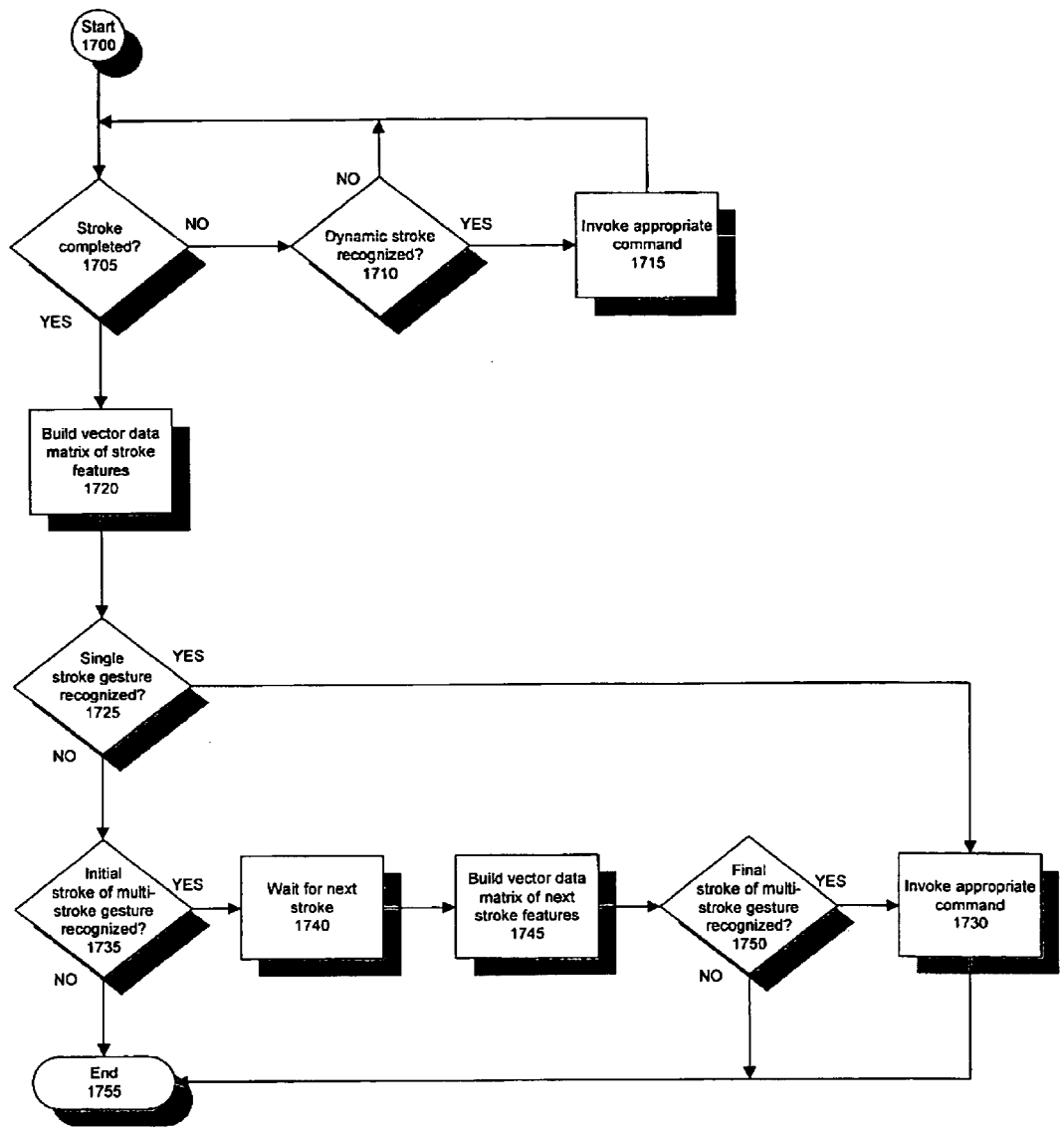
FIG. 17 is a flowchart of steps for recognizing gestures in accordance with an exemplary embodiment of the present invention.

FIG. 17 is a flowchart of steps for recognizing gestures in accordance with an exemplary embodiment of the present invention. In this embodiment, a multi-stroke gesture comprises two strokes. The process starts when user 200 begins drawing a stroke with input device 120 in Web browser 160 (step 1700). Annotation software 170 continuously monitors the stroke to determine when it has completed (step 1705). During the drawing of the stroke ("no" branch of step 1705), annotation software 170 determines whether a dynamic gesture is being employed through a process known eager recognition (step 1710). If a dynamic stroke is recognized ("yes" branch of step 1710), then annotation software 170 invokes the appropriate command to Web browser 160 (step 1715) before resuming stroke monitoring. After the stroke is completed ("yes" branch of step 1705), annotation software 170 builds a vector data matrix of the stroke features (e.g., number of direction changes, length of stroke, horizontal and vertical dot products, x and y positioning, time elapsed from start to end of stroke, and beginning and end points) in temporary storage device 140 (step 1720).

Annotation software 170 recognizes a gesture by comparing the vector data matrix with recognizer objects, which are stored matrices associated with each multi-stroke and single stroke gesture utilized by annotation software 170. Annotation software first compares the vector data matrix with its recognizer objects for single stroke gestures (step 1725). If the stroke is recognized ("yes" branch of step 1725), annotation software 170 invokes the appropriate command to Web browser 160 (step 1730), and the process ends (step 1755). If the stroke is not recognized as a single stroke gesture ("no" branch of step 1725), annotation software 170 compares the vector data matrix with its recognizer objects for the initial stroke of multi-stroke gestures (step 1735). If the initial stroke is recognized ("yes" branch of step 1735), then annotation software 170 waits for the next stroke (step 1740) and builds a corresponding vector data matrix of stroke features (step 1745). Since this embodiment comprises two-stroke multi-stroke gestures, the next stroke is the final stroke of the multi-stroke gesture. If the final stroke is recognized ("yes" branch of step 1750), then annotation software 170 invokes the appropriate command to Web browser 160 (step 1730), and the process ends (step 1755). If the initial stroke is not recognized as part of a multi-stroke gesture ("no" branch of step 1735), or the final stroke is not recognized as part of a multi-stroke gesture ("no" branch of step 1750), the process ends (step 1755).

Dog-Ears

Figure 19:
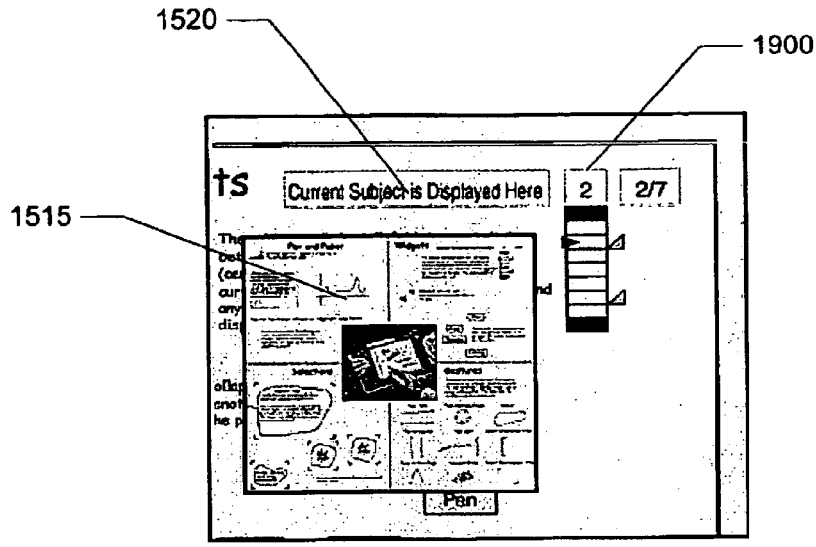
FIG. 19 depicts a navigation widget in accordance with an exemplary embodiment of the present invention.
Figure 18:
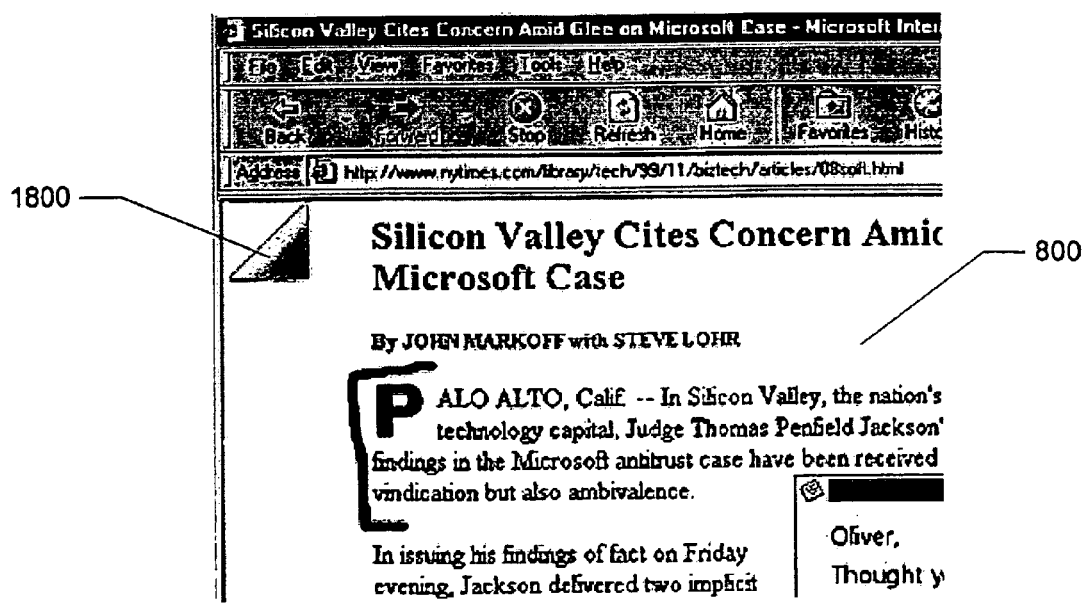
FIG. 18 depicts a dog-eared WBD in accordance with an exemplary embodiment of the present invention.

In the present invention, dog-ears provide a novel way to organize and index annotated WBDs 800 in a Web browser 160. As shown in FIG. 18, dog-ear 1800 marks annotated WBD 800 for later retrieval and resembles a folded corner of annotated WBD 800. Users 200 may search through previously dog-eared annotated WBDs 800 by using the navigation widget 1900, as shown in FIG. 19. Each rectangle in navigation widget 1900 represents an annotated WBD 800, and the annotated WBDs 800 with dog-ears 1800 have a small triangle to the right of their representative rectangle. As user 200 selects each rectangle in navigation widget 1900, annotation software 170 displays a thumbnail 1515 of the associated annotated WBD 800 to the left of navigation widget 1900, and displays the associated category 1520, if it exists, above the thumbnail 1515.

Figure 21:
FIG. 21 depicts a flip to dog-ear gesture representation in accordance with an exemplary embodiment of the present invention.
Figure 20:
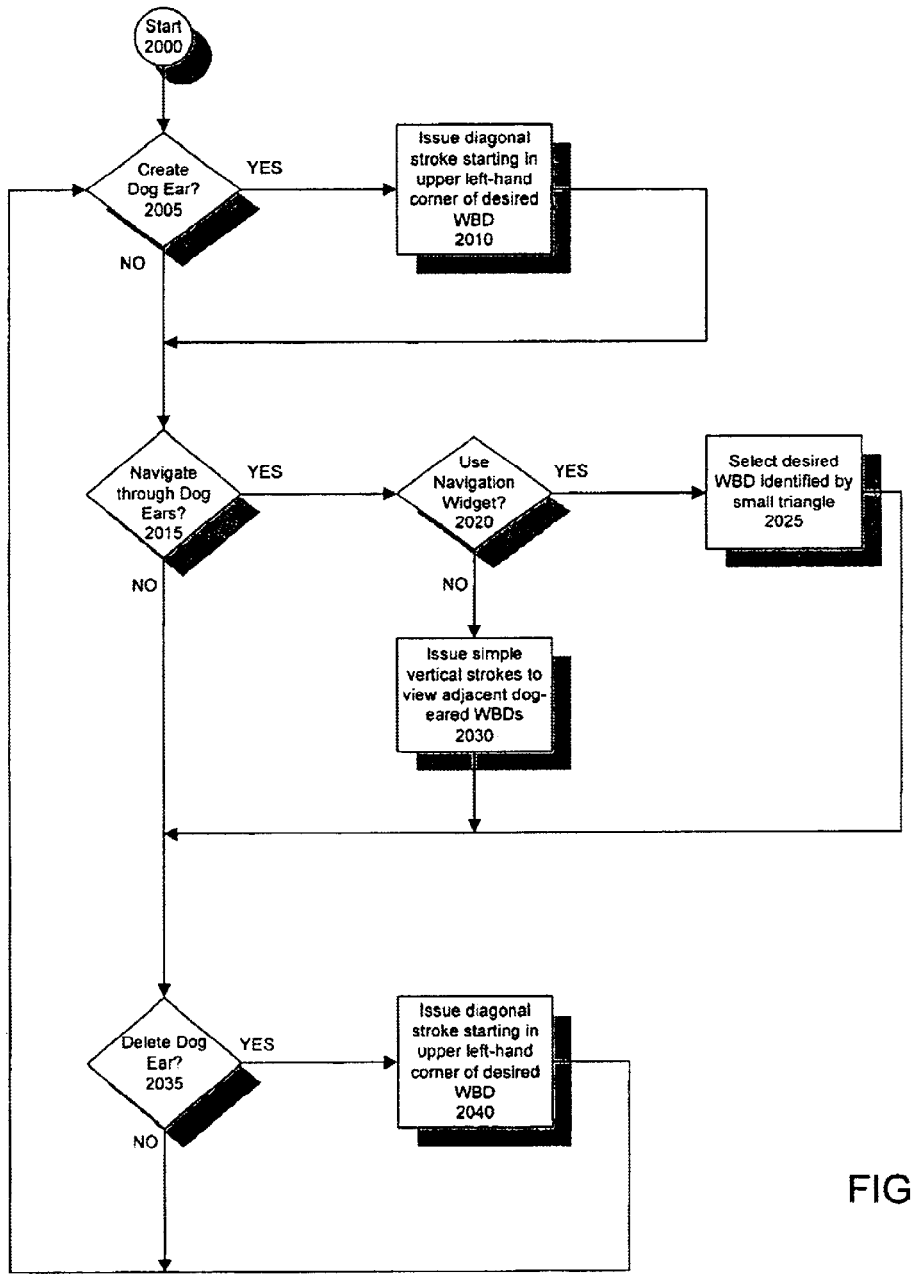
FIG. 20 is a flowchart of steps for creating, deleting, and navigating through dog-ears in accordance with an exemplary embodiment of the present invention.

FIG. 20 is a flowchart of steps for creating, deleting, and navigating through dog-ears 1800 in accordance with an exemplary embodiment of the present invention. The method starts in step 2000. If user 200 wishes to create a dog-ear 1800 ("yes"branch of step 2005), user 200 issues a diagonal stroke gesture with input device 120 in the upper left-hand corner of the desired annotated WBD 800 (step 2010). If user 200 chooses to navigate through existing dog-eared annotated WBDs 800 ("yes" branch of step 2015), user 200 may utilize either navigation widget 1900 or input device 120 gestures. If user 200 chooses the navigation widget 1900 ("yes" branch of step 2020), then user 200 selects the desired annotated WBD 800 identified by the small triangle (step 2025), as shown in FIG. 19. If user 200 chooses to use input device 120 gestures, then user 200 issues simple vertical strokes to view adjacent dog-eared annotation WBDs 800 (step 2030), as shown in FIG. 21. The circular end of the flip to dog-ear gesture representation in FIG. 21 denotes where input device 120 activates the stroke. For example, the left gesture representation in FIG. 21 comprising a downward stroke may issue the command to annotation software 170 to flip to the following dog-eared annotated WBD 800, whereas the right gesture representation in FIG. 21 comprising an upward stroke may issue the command to annotation software 170 to flip to the previous dog-eared annotated WBD 800. If user 200 decides to delete a dog-ear 1800 ("yes" branch of step 2035), then user 200 repeats the diagonal stroke gesture of step 2010 (step 2040). In another embodiment, the gesture in step 2040 could operate in the reverse direction (i.e, issue the diagonal stroke toward the upper left-hand corner of annotated WBD 800).

One exemplary embodiment in accordance with the present invention uses the IE implementation of the DOM in combination with CSS and DHTML technology. When user 200 creates a dog-ear 1800 on annotated WBD 800 (step 2010), annotation software 170 places a "true" value in the dog-ear 535 field of the associated annotation record 500. When user 200 employs the navigation widget 1900 to select a dog-ear 1800 (step 2025), annotation software places the small triangle denoting a dog-ear 1800 next to each rectangle associated with annotation records 500 with a "true" value in the dog-ear 535 field. When user 200 employs the flip to dog-ear gestures as shown in FIG. 21, annotation software 170 searches forward or backward in annotation database 280 to select the annotation records 500 containing a "true" value in the dog-ear 535 field. And when user 200 deletes a dog-ear 1800 from annotated WBD 800 (step 2040), annotation software 170 places a "false" value in the dog-ear 535 field of the associated annotation record 500.

Splitting Pages

Figures 22, 23, 24, 25:
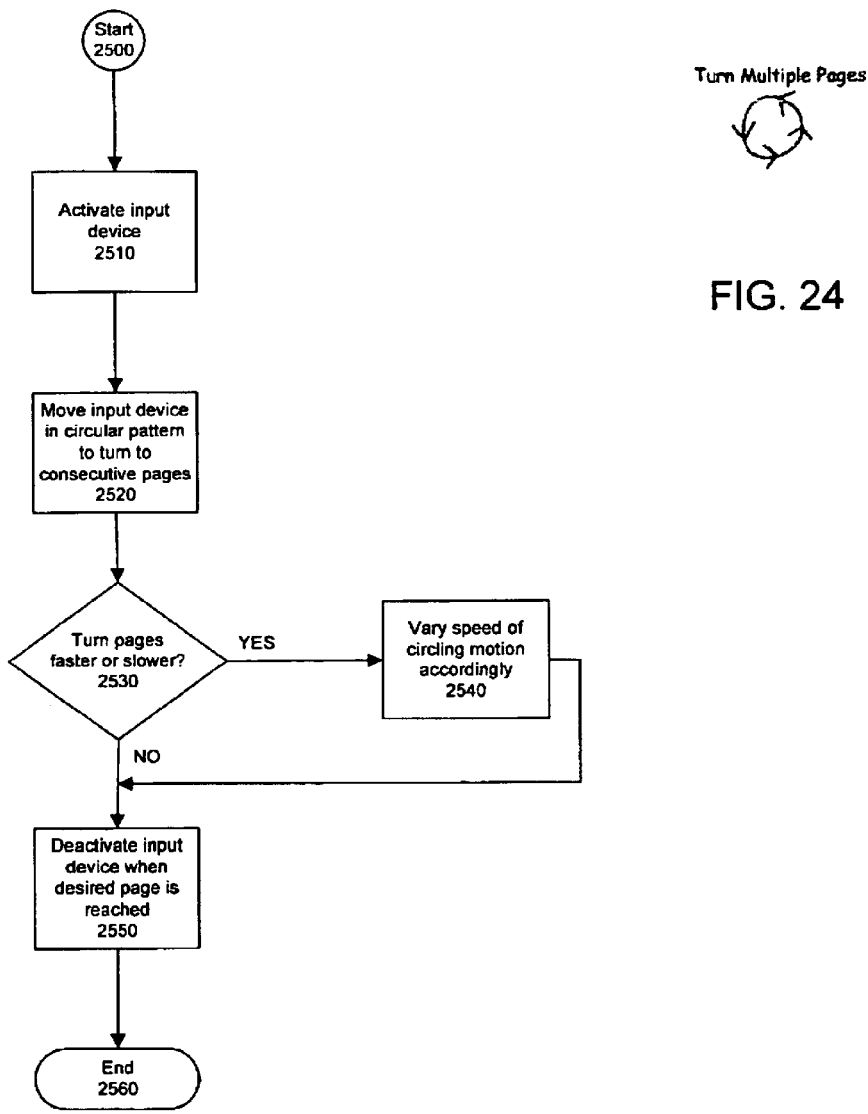
FIG. 22 depicts a page split gesture representation in accordance with an exemplary embodiment of the present invention.
FIG. 23 depicts a page turn gesture representation in accordance with an exemplary embodiment of the present invention.
FIG. 24 depicts a spiral page-turning gesture representation in accordance with an exemplary embodiment of the present invention.
FIG. 25 is a flowchart of steps for turning multiple pages with a dynamic gesture in accordance with an exemplary embodiment of the present invention.

The present invention employs novel page split gestures, as shown in FIG. 22, that divide a WBD either horizontally or vertically. For example, the left gesture representation in FIG. 22 comprising a jagged horizontal stroke may issue the command to annotation software 170 to split a WBD horizontally, whereas the right gesture representation in FIG. 22 comprising a jagged vertical stroke may issue the command to annotation software 170 to split a WBD vertically. Annotation software 170 may use the IE implementation of the DOM in combination with CSS and DHTML technology to split the WBD using standard browser frame technology.

Turning Pages

The present invention employs novel single stroke and dynamic page turning gestures, as shown in FIG. 23 and FIG. 24, that flip to the previously or subsequently viewed WBD. For example, the top gesture representation in FIG. 23 comprising a single left horizontal stroke may issue the command to annotation software 170 to flip to a previously viewed WBD, whereas the bottom gesture representation in FIG. 23 comprising a single right horizontal stroke may issue the command to annotation software 170 to flip to a subsequently viewed WBD. Annotation software 170 may turn the pages by using standard browser calls.

FIG. 25 is a flowchart of steps for turning multiple pages with a dynamic gesture in accordance with an exemplary embodiment of the present invention. In this embodiment, the pages of the WBD turn faster or slower depending upon the speed of user 200's circling input device 120. A graphical representation of the dynamic gesture is illustrated in FIG. 24. The method for using the dynamic gesture starts in step 2500. User 200 first activates input device 120 in step 2510. If input device 120 is a mouse in one embodiment, user 200 satisfies this step by left-clicking the mouse. If input device 120 is a pen or stylus, user 200 satisfies this step by touching the pen or stylus to the touch screen. User 200 then moves input device 120 in a circular pattern to turn to consecutive pages (step 2520). Turning in a counterclockwise direction may flip to previous pages, whereas turning in a clockwise direction may flip to subsequent pages. If user 200 wants to turn pages faster or slower ("yes" branch of step 2530), user 200 varies the speed of the circling motion accordingly (step 2540). In other words, if user 200 wants to flip through pages faster, user 200 would increase the rotational speed of input device 120. Alternatively, if user 200 wants to flip through pages slower, user 200 would decrease the rotational speed of input device 120. When user 200 reaches the desired page, user 200 deactivates input device 120 (step 2550). If input device 120 is a mouse, this is accomplished by user 200 releasing the click button. If input device 120 is a pen or stylus, this is accomplished by user 200 lifting the pen or stylus from the touch screen. This method ends in step 2560.

Selecting Portions of Page

Figure 26:
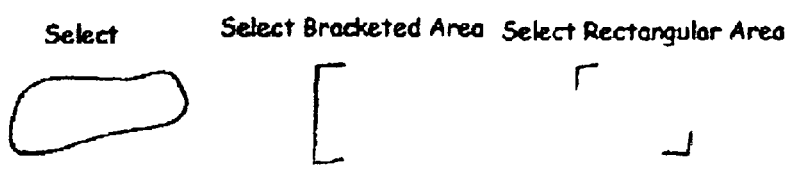
FIG. 26 depicts three selection gesture representations in accordance with an exemplary embodiment of the present invention.

The present invention employs three novel selection gestures, as shown in FIG. 26. The left gesture representation in FIG. 26 comprising a closed loop stroke may issue the command to annotation software 170 to select the area inside the loop. The middle gesture representation in FIG. 26 comprising a bracket stroke may issue the command to annotation software 170 to select the area bound by the bracket's three sides with no boundary on the fourth side. And the right gesture representation in FIG. 26 comprising two corner strokes issue the command to annotation software 170 to select the square area bound by the two edges. Annotation software 170 may use the IE implementation of the DOM in combination with CSS and DHTML technology to select these areas. Once the area is selected, user 200 may copy, move or paste the selection anywhere a typical graphical selection could be copied or pasted.

Shaking Out a Copy

Figure 27:
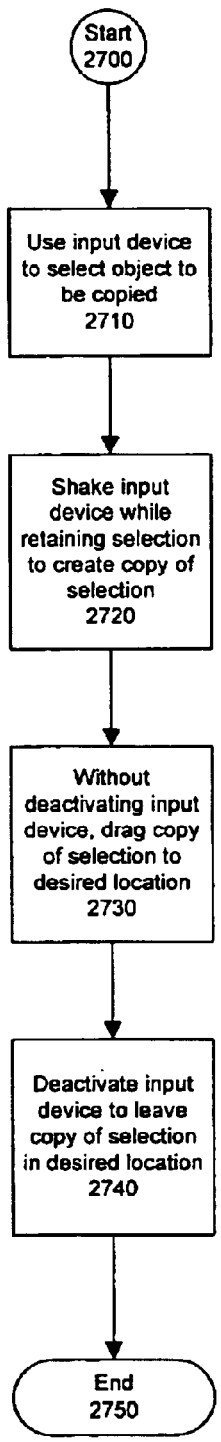
FIG. 27 is a flowchart of steps for performing a shaking out a copy gesture in accordance with an exemplary embodiment of the present invention.

The present invention employs a novel dynamic gesture that allows a selected area of a WBD to be copied by shaking it. FIG. 27 is a flowchart of steps for performing a shaking out a copy gesture in accordance with an exemplary embodiment of the present invention. The method starts in step 2700. User 200 first uses input device 120 to select an object or area to be copied (step 2710). While retaining selection of the object, user 200 shakes the selection back and forth with input device 120 to create a copy of the selection (step 2720). Without deactivating input device 120, which would deselect the object, user 200 drags the copy of the selection to the desired location (step 2730). User 200 then deactivates input device 120, leaving the copy of the selection in the desired area (step 2740). The process ends in step 2750. Annotation software 170 may use the IE implementation of the DOM in combination with CSS and DHTML technology to shake out the copy.

Right-Handedness and Left-Handedness of Marking Menus

Figure 28:
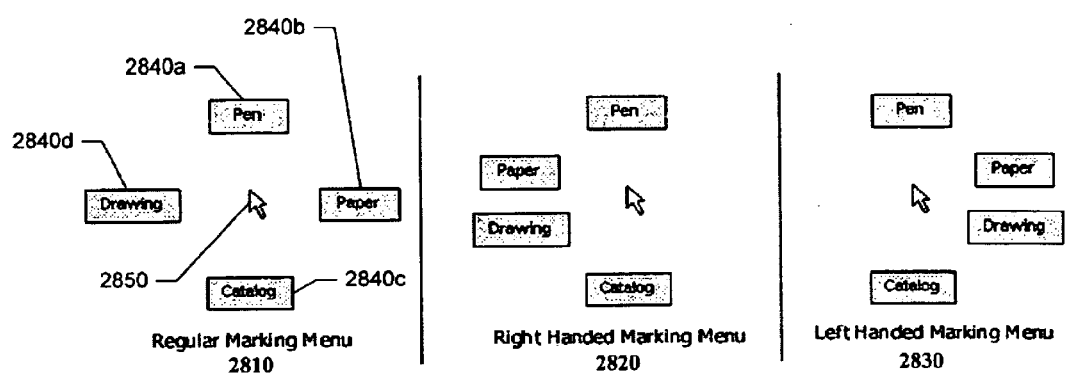
FIG. 28 illustrates a tap and dwell menu in accordance with a pen-based embodiment of the present invention.

The present invention employs a novel marking menu that can be arranged to suit the hand position of right-handed and left-handed users 200. FIG. 28 illustrates a tap and dwell menu in accordance with a pen-based embodiment of the present invention. A standard marking menu 2810 can be summoned by any type of gesture, such as a double tap with the pen, a dwell with the pen (holding down the pen without lifting it) or a tap with the stylus button pressed. The regular marking menu 2810 then appears in the place the gesture was made, allowing user 200 to choose a menu item 2840a–2840d without having to focus attention to another area of the screen as with traditional static menus. The menu items 2840a–2840d are laid out radially rather than as a list, and allow imprecise picks. Once user 200 is familiar with the arrangement of the menu, it is easy to make a selection without even reading the menu, since user 200 only needs to know which direction to move the pen 2850 from the location of the gesture that summoned the menu. The marking menus of the present invention display menu items 2840a–2840d in the area that is most visible to user 200, taking into account the positioning of user 200's hand. For instance, a right-handed user 200 would use the right handed marking menu 2820, whereas a left-handed user 200 would use the left handed marking menu 2830.

Several embodiments of the present invention are specifically illustrated and/or described herein. However, it will be appreciated that modifications and variations of the present invention are covered by the teachings and within the purview of the appended claims without departing from the spirit and intended scope of the present invention.

What is claimed is:

1. A method for annotating a Web-based document and viewing the annotated document, comprising the steps of:
   (a) generating annotation data by processing first user input provided to annotation client software by a first user of the annotation client software;
   (b) associating the annotation data with the document to create the annotated document, the document being displayed via a Web browser;

(c) providing the annotated document to an annotation server;

(d) with the annotation server, generating a graphic data file corresponding to a visual layout of the annotation data;

(e) when a second user of the annotation client software attempts to view the annotated document, generating the annotated document for the second user as a function of the document and the associated annotation data including
(i) enclosing the annotated document inside a fixed-sized layer of the Web browser,
(ii) examining each element of the annotated document to detect particular properties which cause the element to move relative to a predetermined corner of the annotated document during resizing of the Web browser, and
(iii) modifying the particular properties to prevent such movements;

(f) when a third user not employing the annotation client software attempts to view the annotated document, generating the annotated document and providing the annotated document to the third user as a function of the document, the graphic data and predetermined programming codes; and (g) before step a, preventing elements of the document from moving when the document is being one of resized and manipulated.

2. The method according to claim 1, wherein the annotation data includes at least one of ink marks, highlight marks, text-based note windows and audio dictations.

3. The method according to claim 1, wherein the document is a blank document.

4. The method according to claim 1, wherein the predetermined corner is a top left corner of the document.

5. The method according to claim 1, wherein each of steps (b) and (e) includes the sub-step of utilizing at least one ActiveX control to draw ink images and text-based note windows over the document based on the annotated data.

6. A method wherein the graphical data file situated on a top of the annotated document is transparent in every location of the annotated document except locations which include ink marks, for annotating a Web-based document and viewing the annotated document, comprising the steps of:

(a) generating annotation data by processing user input provided to annotation client software by a first user of the annotation client software;

(b) associating the annotation data with the document to create the annotated document, the document being displayed via a Web browser;

(c) providing the annotated document to an annotation server;

(d) with the annotation server, generating a graphic data file corresponding to a visual layout of the annotation data;

(e) when a second user of the annotation client software attempts to view the annotated document generating the annotated document for the second user as a function of the document and the associated annotation data; and (f) when a third user not employing the annotation client software attempts to view the annotated document, generating the annotated document and providing the annotated document to the third user as a function of the document, the graphic data and predetermined programming codes, and wherein step (f) further includes the substeps of:
(i) inserting a further layer into the document to overlay each text-based note window of the annotated document,
(ii) overlaying four identical copies of the graphical data file on top of the annotated document, and
(iii) changing clipping rectangles of the four identical copies in response to the user input to provide proper passage of the user input to the annotated document.

* * * * *